US007005963B1

(12) United States Patent
Scalisi et al.

(10) Patent No.: US 7,005,963 B1
(45) Date of Patent: *Feb. 28, 2006

(54) CALL RECEIVING METHOD AND APPARATUS HAVING TWO-WAY TEXT MESSAGING AND AUTOMATIC RETRIEVAL OF CALL NUMBERS MAKING CALLS TO APPARATUS

(76) Inventors: Joseph F. Scalisi, 385 S. Lemon Ave., E256, Walnut, CA (US) 91789; David Butler, 6 Perry Close, Appledown, Newert, Gloucester, Gloucestershire (GB) GL181TP; Lawrence E. Hecox, 21 68th Pl., Long Beach, CA (US) 90803

( * ) Notice: Subject to any disclaimer, the term of this patent is extended or adjusted under 35 U.S.C. 154(b) by 607 days.

This patent is subject to a terminal disclaimer.

(21) Appl. No.: 09/638,587

(22) Filed: Aug. 15, 2000

Related U.S. Application Data

(63) Continuation-in-part of application No. 09/499,058, filed on Feb. 4, 2000, now Pat. No. 6,879,244, which is a continuation-in-part of application No. 08/859,904, filed on May 21, 1997, now abandoned.

(51) Int. Cl.
*H04Q 1/30* (2006.01)
(52) U.S. Cl. ........................................ 340/7.1; 455/565
(58) Field of Classification Search ................ 340/7.1, 340/7.21, 7.31, 7.52, 7.39, 7.42, 7.58, 311.2; 455/552.1, 566, 574, 556.1, 458, 466, 557, 455/551, 412.1, 565
See application file for complete search history.

(56) References Cited

U.S. PATENT DOCUMENTS 3,755,794 A * 8/1973 Stapleford .................. 704/201

| 4,682,351 | A | | 7/1987 | Makino |
| 4,747,122 | A | | 5/1988 | Bhagat et al. |
| 4,908,848 | A | | 3/1990 | Hanawa |
| 5,003,576 | A | | 3/1991 | Helferich |
| 5,117,449 | A | * | 5/1992 | Metroka et al. .......... 455/552.1 |
| 5,148,473 | A | | 9/1992 | Freeland et al. |
| 5,151,929 | A | | 9/1992 | Wolf |
| 5,203,009 | A | | 4/1993 | Bogusz et al. |
| 5,303,297 | A | | 4/1994 | Hillis |
| 5,325,418 | A | | 6/1994 | McGregor et al. |
| 5,365,570 | A | | 11/1994 | Boubelik |
| 5,392,452 | A | | 2/1995 | Davis |
| 5,418,835 | A | | 5/1995 | Frohman et al. |
| 5,425,083 | A | | 6/1995 | Furuya et al. |
| 5,473,671 | A | | 12/1995 | Partridge, III |
| 5,479,482 | A | | 12/1995 | Grimes |
| 5,491,739 | A | | 2/1996 | Wadin et al. |
| 5,495,517 | A | | 2/1996 | Ide et al. |

(Continued)

FOREIGN PATENT DOCUMENTS

WO    WO 88/06830    9/1988

(Continued)

*Primary Examiner*—Michael Horabik
*Assistant Examiner*—William Bangachon

(57) ABSTRACT

A system and method for a call receiving pager apparatus, system and method utilizing a dedicated switch for providing proprietary access, billing functions and other enhanced features is described. The system utilizes a subscriber apparatus having pager or radiotelephone functions whereby a caller may call the apparatus and gain direct two-way communication with the subscriber. The caller is billed for the communication. A call receiving pager apparatus, system and method which enables two-way text messaging as well as the storage, retrieval, and recall of telephone numbers making calls to the pager apparatus where the recalls are made by way of sending a data package to the stored caller number is described. The subscriber is unable to initiate any real time two-way communication with the outgoing connection.

10 Claims, 21 Drawing Sheets

U.S. PATENT DOCUMENTS

| | | | |
|---|---|---|---|
| 5,511,111 A | 4/1996 | Serbetcioglu et al. | |
| 5,574,771 A | 11/1996 | Driessen et al. | |
| 5,574,772 A * | 11/1996 | Scalisi et al. | 455/565 |
| 5,581,594 A | 12/1996 | McAfee | |
| 5,602,907 A | 2/1997 | Hata et al. | |
| 5,625,884 A | 4/1997 | Gitlin et al. | |
| 5,701,337 A | 12/1997 | Silver et al. | |
| 5,737,707 A | 4/1998 | Gaulke et al. | |
| 5,749,052 A | 5/1998 | Hidem et al. | |
| 5,835,856 A | 11/1998 | Patel | |
| 5,842,141 A * | 11/1998 | Vaihoja et al. | 455/574 |
| 6,226,495 B1 * | 5/2001 | Neustein | 340/311.2 |

FOREIGN PATENT DOCUMENTS

| | | |
|---|---|---|
| WO | WO 92/14330 | 8/1992 |

* cited by examiner

CALL RECEIVING METHOD AND APPARATUS HAVING TWO-WAY TEXT MESSAGING AND AUTOMATIC RETRIEVAL OF CALL NUMBERS MAKING CALLS TO APPARATUS

CROSS-REFERENCE TO RELATED APPLICATION

This application is a continuation-in-part application of U.S. patent application having Ser. No. 09/499,058, filed Feb. 4, 2000 now U.S. Pat. No. 6,879,244, which is a continuation-in-part based on U.S. patent application Ser. No. 08/859,904, filed May 21, 1997 now abandoned. This application is also related to U.S. Pat. No. 5,574,772 entitled "Personal Apparatus for Receiving Radiotelephone Communications.

FIELD OF THE INVENTION

The present invention relates generally to a call receiving pager apparatus, system, and method utilizing a dedicated switch which employ real time two-way wireless communication that can only be initiated by, and billed to, a caller and which enable two-way text messaging between a caller and a call receiving pager apparatus subscriber which can be billed in part or in whole to the subscriber. The present invention also includes the storage, retrieval, and recall of outside caller numbers that have made calls to the apparatus. The call receiving pager system and method utilizes paging signals or cellular signals to create a two-way wireless communication connection between an outside caller and a pagephone/call receiving pager apparatus user/subscriber. More particularly, the present invention is directed to a call receiving pager apparatus, system and method which utilizes a subscriber paging apparatus capable of receiving pager signals or cellular signals and an outside dedicated switching system to 1) generate real time two-way wireless communication by an outside caller calling a subscriber's page number wherein the caller is billed for the communication time and the subscriber is unable to incur communication charges due to their inability to initiate a direct two-way wireless communication with the call receiving pager apparatus, 2) generate two-way text messaging between a caller and a subscriber which may be billed in part or in whole to the subscribe, and 3) store, retrieve and recall outside caller numbers that have made previous calls to the apparatus. Further, although the subscriber is unable to initiate a real time, direct two-way wireless communication using the call receiving pager apparatus, the system and method of the present invention may include the ability to split the cost, or a portion of the cost, for any given call between the subscriber and the caller.

The present invention is also directed to a call receiving pager system, method and apparatus having call back request features. The call back request features comprise a switching means located on the apparatus that is capable of sending a pre-recorded voice or data message from the subscriber apparatus to an emergency telephone number such as "911" and/or other pre-determined telephone numbers which are stored within the device. These predetermined telephone numbers may also include the telephone numbers that are stored within the device as a result of the storage, retrieval and recall of outside caller numbers that have made previous calls to the device. The pre-recorded voice or data message which is sent to these stored numbers requests or instructs the party receiving the pre-recorded voice or data message to initiate contact with the subscriber by calling the subscriber's page number. Paging the subscriber initiates two-way wireless communication which can be carried out when the subscriber answers the call being made to the subscriber apparatus.

The predetermined telephone number may be a call center telephone number. In this case, a subscriber receiving a call back from the call center may incur an airtime charge which can be charged on a pre-paid basis using a credit card or pre-paid account. Once the subscriber answers the call back from the call center operator, the subscriber may request connection by the operator to a specific number wherein the operator makes the connection on a collect call basis or pre-paid basis with a credit card or pre-paid card. In addition, the present invention includes the ability for the subscriber to create original text messages that are sent as data packets to outside callers capable of receiving such data messages.

BACKGROUND OF THE INVENTION

Mobile radio communication is well known in the art. Cellular radio has spawned Personal Communication Service (PCS). PCS is wireless and the user requires no tether such as the wire pair that connects a conventional telephone to a local serving switch. Cellular radio with a hand held terminal, i.e. hand held cellular telephones, gives the user tetherless telephone communication. Further, paging systems provide the mobile and ambulatory user with a means of being alerted that someone wishes to contact or talk to that person. The cordless telephone is yet another example of a tetherless personal communication device.

The public switched telecommunications network (PSTN) is vast and includes hundreds of national networks that are interconnected to form a gigantic international network. Cellular service is an adjunct to the network. Cellular radio systems provide two-way signaling and communication by usually connecting a mobile terminal to another user through the PSTN where the other user is most commonly a subscriber of the PSTN. Nevertheless, the other user may be a mobile terminal. Most of the connectivity involves connecting wired telephone service to mobile users. The mobile telephone switching office (MTSO) is the heart of a cellular system for a specific serving area. The MTSO is connected to the PSTN by a trunk group. Trunks are the telephone lines connecting one telephone switch or exchange with another.

In contrast, paging is a one-way radio alerting system that is a simple extension of the PTSN. Unlike cellular radio systems, the direction of transmission is from a fixed paging transmitter to an individual. Some pagers have digital readouts which provide the individual with a number to call back while others give a short message or enable a transmitter to leave a voice mail by hooking into a voice mail system.

Technology in recent years has resulted in a vast number of cordless telephones, cellular telephones and paging apparatus which exhibit a variety of unique and multiple features. For example, the following described inventions are directed to cellular telephones. U.S. Pat. No. 4,908,848 issued to Hanawa discloses an apparatus for a mobile communication system having a handset which can be programmed to lock calls, restrict calls, or time calls. U.S. Pat. No. 5,203,009 issued to Bogusz et al. describes a cellular telephone having a fixed calling capacity which limits the use of the phone by only enabling it to call emergency telephone numbers. A similar cellular telephone is described in U.S. Pat. No. 5,365,570 issued to Boubelik which discloses an emergency radio telephone apparatus having a housing, a radio transceiver for receiving and transmitting modulated radio signals, and an actuator connected to the housing for actuating the transceiver and initiating the process of connecting to a predetermined emergency phone number. U.S. Pat. No. 4,845,772 issued to Metroka et al. describes a portable radiotelephone with control switch disabling having a keypad covered by a movable element which produces an on-hook condition when the movable element is in a first position covering the keypad, and an off-hook condition when the movable element is in a second position exposing the keypad.

Numerous paging systems having various functions and capabilities are also well known in the prior art. For example, U.S. Pat. No. 4,906,989 issued to Kasugai describes a paging system having a vehicle mounted repeater with a portable paging receiver detachably mounted on the repeater. Also, U.S. Pat. No. 4,940,963 issued to Gutman et al. discloses a paging system having a centrally located terminal and a plurality of remote pager units wherein both automatic and manual acknowledge back signaling is provided.

The prior art also includes combined radiotelephone and paging systems as evidenced by the following: i) U.S. Pat. No. 5,040,204 issued to Sasaki et al. discloses a cordless telephone apparatus with a removably mounted pager which reports an incoming signal from a parent device or radiotelephone; ii) U.S. Pat. No. 4,747,122 issued to Bhagat et al. describes a mobile paging call back system which includes a control unit interconnecting a radio pager, a memory, an indicator, a control switch, and an automatic dialer with the control unit including a logic circuit that is programmed to verify valid telephone number information received from a pager, to store the verified data in memory, to activate the indicator to show that valid data has been received and to transfer the stored data to the automatic dialer to reach a mobile radiotelephone; iii) U.S. Pat. No. 5,117,449 issued to Metroka et al. discloses an integrated paging and radiotelephone apparatus which combines paging and cellular radiotelephone functions in a single unit having dual receivers thereby allowing reception of paging signals simultaneously with cellular radiotelephone signals; and iv) U.S. Pat. No. 5,148,473 issued to Freeland et al. which describes an apparatus combining a radio pager and a cellular radiotelephone into one unit which may automatically receive a plurality of pages while the cellular radiotelephone is on and communicating a cellular telephone call, or off or unattended.

Although combined radiotelephone and paging systems have been described, none of those systems prevents initiation of a direct two-way wireless voice communication by the subscriber or holder of the dual paging/radiotelephone system, and none are applicable outside the United States where calling party pays (CPP) exists when the caller and subscriber are activated. Either one or both of these features would drastically reduce fraudulent use of the wireless two-way communication system. Further, implementation of either or both of these features would enable a subscriber to exert optimum control over costs.

Accordingly, there is a need for a call receiving pager apparatus, system and method utilizing a dedicated switch which allow for incoming calls but prevent direct outgoing calls in order to control costs and fraudulent use of the system. This is particularly useful in those situations where companies would like to enable their employees to have direct real-time wireless two-way communication with one another in order to facilitate job efficiency. For example, individual employees such as sales persons, drivers and delivery personnel, real estate agents, and hospital personnel could be equipped with the present invention in order to communicate with others within or outside of their organization either out in the field or within a large facility that houses the employees. There is also a need for such a call receiving pager apparatus, system and method utilizing a dedicated switch where the calling party is billed for the call so that a pager number is not given out to numerous individuals by the person carrying the apparatus thereby enabling anyone to run up telephone toll charges associated with use of the apparatus during two-way communication.

Parents are another target market for this call receiving pager apparatus, system and method utilizing a dedicated switch in that it would enable children to be directly connected to their parents upon being paged by their parents or enable them to request connection to their parents on a pre-paid basis or collect call basis without the expense of cellular telephone charges. Such an apparatus, system and method will prevent the accumulation of billings associated with frivolous or unnecessary calls made by children in that the apparatus, system and method do not allow those possessing the apparatus to make direct outgoing calls. Further, if the apparatus were stolen, it would be impossible to commit further fraud by charging the subscriber of the apparatus for calls because the apparatus, system and method employ caller generated billing.

Some of these same objectives for the target markets described above may also be achieved by providing two-way text messaging with the above described apparatus where the text messaging can be billed in part or in whole to an outside caller number.

Finally, there is also a need for a call receiving pager apparatus, system and method utilizing a dedicated switch which provide a subscriber of the apparatus with an ability to contact a predetermined number or call center number without enabling the subscriber to initiate real time, direct two-way wireless communication with the predetermined number or call center number thereby keeping the fraud and cost control functions of the system, method and apparatus intact. This is achieved by enabling the method, system and apparatus to send a pre-recorded voice or data message from the subscriber apparatus to a pre-determined telephone number such as an emergency number, e.g. "911", a home telephone number, an office or business number, or a call center number. Upon connection with the pre-determined number or call center number, the transmitted pre-recorded voice or data message informs the receiver of the call as to the subscriber's name and the subscriber's page number. The pre-recorded voice or data message may also include a brief message from the subscriber and then instructs the receiver to page/call the subscriber in order to offer the receiver a number of services that are available including pre-paid connection. When the receiver has no pre-paid account and no means for credit card payment, no calls can be made to the subscriber thereby avoiding fraud. However, the subscriber is still unable to initiate direct two-way voice communication in that a call back to the subscriber can only be made by an automated or manual operator. The predetermined telephone number may also include outside caller telephone numbers which have been stored in a database as a result of the caller calling the apparatus. These outside caller numbers can then be searched and selected by the subscriber so that the subscriber can create an original text message to send to the outside caller or, alternatively, the subscriber may send a pre-recorded voice message or text message. The subscriber may also request a call back from a selected stored number by having an automated or manual operator make a connection to the stored number on a pre-paid or collect basis where the pre-paid or collect call is charged to either the call receiver or the subscriber.

SUMMARY OF THE INVENTION

It is an object of the present invention to provide a call receiving pager apparatus, system, and method utilizing a dedicated switch to 1) direct two-way wireless communication between a subscriber of the call receiving pager apparatus and a caller that can only be initiated by the caller, 2) enable two-way text messaging between the subscriber and the caller, and 3) store, retrieve, and recall outside caller numbers that have made previous calls to the apparatus.

It is another object of the present invention to provide a call receiving pager apparatus, system and method utilizing a dedicated switch that establishes instant, direct two-way wireless communication between a public switched telecommunications network caller and a call receiving pager apparatus subscriber wherein the call receiving pager apparatus includes means to receive paging signals or radiotelephone signals through a caller generated billing system.

It is further object of the present invention to provide a call receiving pager apparatus, system and method utilizing a dedicated switch that establishes instant, direct two-way wireless communication between a wireless radiotelephone caller and a user/subscriber of the call receiving pager apparatus wherein the call receiving pager apparatus includes means to receive paging signals or radiotelephone signals through a caller generated billing system.

It is still another object of the present invention to provide a call receiving pager apparatus, system and method utilizing a dedicated switch wherein the dedicated switch is used to provide proprietary access, billing functions and other enhanced features including, but not limited to, calling party pays billing, selective drop in messaging, voicemail service and verification coding.

It is still another object of the present invention to provide a system and method for reducing fraud associated with the personal communications system.

Yet another object of the present invention is to provide a call receiving pager apparatus, system and method utilizing a dedicated switch which enables a subscriber to request a call back to the subscriber of the call receiving pager apparatus from a pre-determined call back number or emergency number without allowing the subscriber to initiate unrestricted, real time, direct two-way wireless communication using the call receiving pager apparatus.

Still another object of the present invention is to provide a call receiving pager apparatus which enables a subscriber to create an original text message or select a pre-recorded or pre-formed text message to send to a selected telephone number or an outside caller number that has been stored in the apparatus phone book as a result of a previous call to the apparatus provided such caller has equipment suitable for receiving such text messages. Pre-recorded or pre-formed text messages may be charged in part or in whole to the subscriber on a pre-paid or credit card basis.

Another object of the present invention is to provide a call receiving apparatus which may have paging and/or radiotelephone functions which has no direct means of dialing outside numbers and thereby running up uncontrolled costs. However, in one aspect of the call receiving apparatus, the subscriber of the apparatus may request or instruct an automated or manual operator to make a call to a number and then connect that called number to the subscriber for two-way communication provided that it has been confirmed that either the subscriber or the party at the called number have means to pay for the call by way of a pre-paid calling card or credit card.

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings wherein like numerals denote like elements.

BRIEF DESCRIPTION OF THE DRAWINGS

The present invention is illustrated by way of example and not limitation in the accompanying figures, in which like references indicate similar elements, and in which.

Figure 1A:
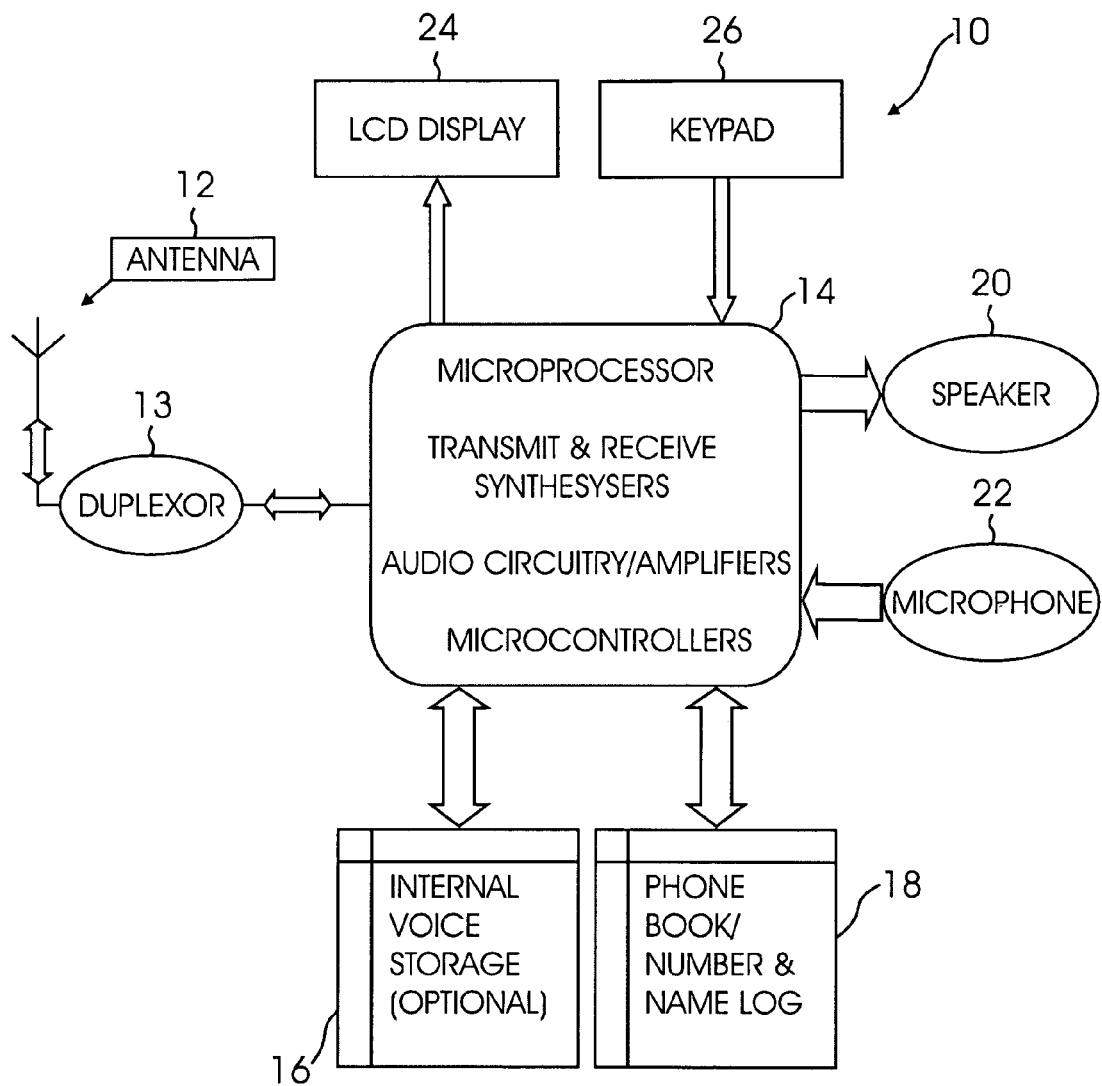
FIG. 1A shows a block diagram of a first preferred embodiment of the electronic circuitry of an apparatus for use with the personal communication system and method of the present invention which employs direct two-way wireless voice communication that cannot be initiated by the subscriber of the apparatus.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PREFERRED EMBODIMENTS

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data transmission protocols and that the systems, methods, and apparatus described herein are merely exemplary applications for the invention. Further, it should be noted that the present invention may employ any number of conventional techniques for data transmission, signaling, data processing, network control, and the like. Such general techniques that may be known to those skilled in the art are not described in detail herein.

It should be appreciated that the particular implementations shown and described herein are illustrative of the invention and its best mode and are not intended to otherwise limit the scope of the present invention in any way. Indeed, for the sake of brevity, conventional signal processing, data transmission, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved and simplified system for interfacing with a telephone or similar communications system, in any selected location, for enabling a caller to contact a user of an apparatus combining paging functions and/or radiotelephone functions (hereinafter referred to as a "pagephone" or a "call receiving pager apparatus") by radiotelephone.

By way of example, and not by way of limitation, set forth below is a description of a preferred embodiment of the simplified system, method and apparatus for carrying out the system of the present invention which is directed to a two-way wireless communication system with one way direct call initiation by a caller and caller generated billing.

Turning now to the drawings, a block diagram 10 of one example of an electronic circuitry of an apparatus for use with the personal communication system of the present invention which employs two-way wireless communication that cannot be directly initiated by a subscriber of the apparatus is shown in FIG. 1. The antenna 12 is used to simultaneously receive and transmit radiotelephone signals by way of duplexer 13. Box 14 contains a microprocessor, transmit and receive synthesizers, audio circuitry and amplifiers, and microcontrollers which are all capable of being coupled to one another in order to carry out the functions of the device. All of the components contained in box 14 may be assembled using components and methods well known in the art. When a signal is received from an outside caller having the correct mobile identification (M.I.D.) number of the pagephone, the microprocessor 18 will activate an alert signal such as an audio signal or vibrator. Activation of a further switch means enables the microprocessor to activate the radiotelephone transmitter so that the pagephone will receive incoming signals and transmit outgoing signals to thereby allow a conversation to take place between the caller and the user of the unit. It is also contemplated that a caller identification system may be incorporated into the method and apparatus of the present invention to allow a user of the apparatus to determine who is paging that user before the user answers the page and connects with the caller.

The apparatus for use with the electronic circuitry preferably comprises a transmitting means that is only capable of transmitting radiotelephone signals that are associated with the signals received from the pagephone. The system may also include an internal voice storage means 16. The system may further include a phone book/number and name log 18 which allows a user to look up a desired telephone number. Speaker 20 is used to transmit a caller's voice and a user's voice mail while microphone 22 is used to receive the user's voice and verbal instructions. Voice mail messages are transmitted to speaker 20 which enables the pagephone user to hear their voice mail messages without accessing a telephone to retrieve their messages. A liquid crystal display (LCD) 24 can show the number of the message, the time the message was left, and the telephone number of the caller, as well as any other information that may be desirable to a user while keypad 26 is used to enter information into the device. In addition, the pagephone apparatus may utilize voice mail messaging means external to the pagephone apparatus which can be accessed by a pagephone subscriber by using any type of direct dial out telephone. (See, e.g., FIGS. 14–16 and their accompanying descriptions which describe the voice mail as being stored in an outside dedicated switch.

Other radiotelephone transceiving apparatus that may be successfully used in conjunction with the caller initiated and billed personal communication system of the present invention are disclosed and described in detail in U.S. Pat. No. 5,574,772 which is directed to a personal apparatus for receiving radiotelephone communications and is herein incorporated by reference.

Figure 1B:
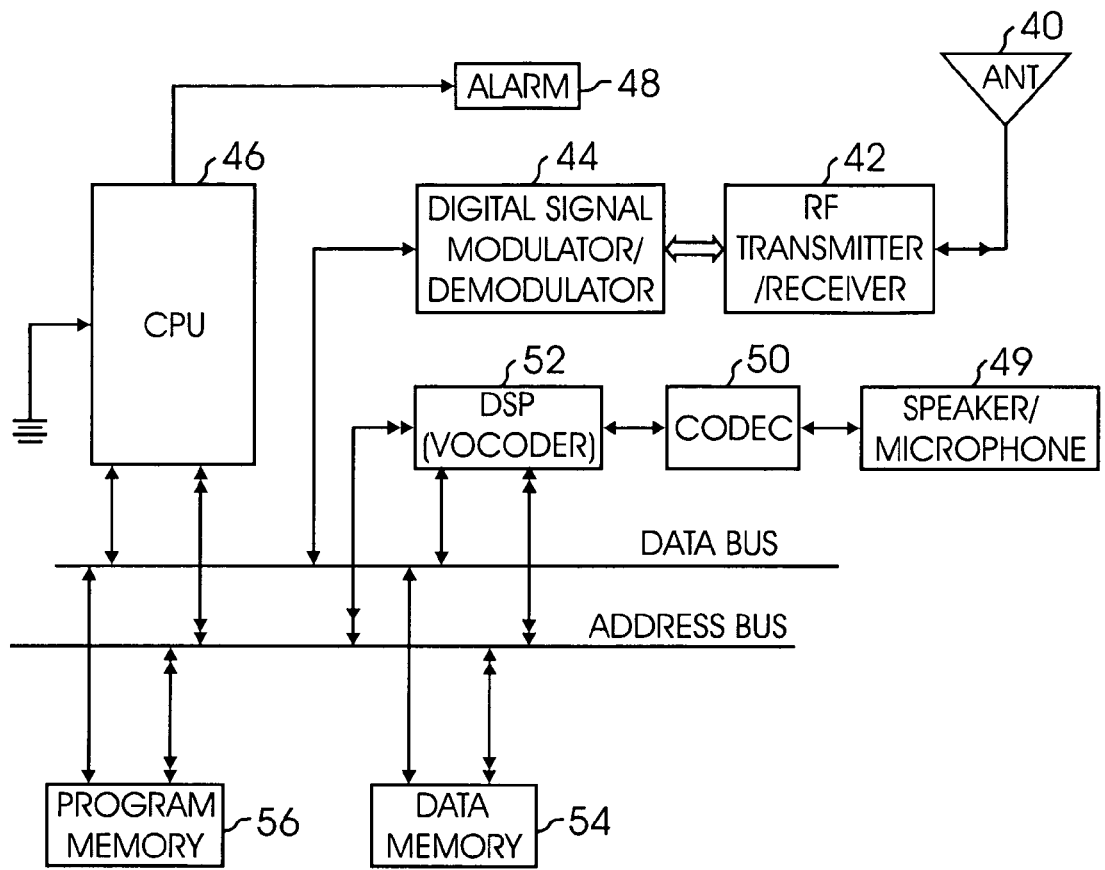
FIG. 1B shows a block diagram of a second preferred embodiment of the electronic circuitry of an apparatus for use with the personal communication system and method of the present invention which employs direct two-way wireless voice communication that cannot be initiated by the subscriber of the apparatus.

A second preferred embodiment of the hardware comprising the electronic circuitry of an apparatus for use with the personal communication system of the present invention which employs direct two-way wireless voice communication that cannot be initiated by a subscriber to the apparatus is shown in FIG. 1B. The major components shown are comparable to those found in most makes of wireless mobile phones.

The antenna 40 is used to receive and transmit radiotelephone signals to and from the radio frequency transmitter/receiver 42. The radio frequency transmitter/receiver 42 converts the radio frequency analog into digital when a signal is received and converts the digital to analogue when a signal is transmitted from the radio frequency transmitter/receiver 42. The digital signal modulator/demodulator 44 is responsible for the generation of the radio frequency signal which is transmitted to the MTSO when the pagephone has been activated upon receipt of a signal. Current state of the art microchips for phones include this functioning for either time division multiple access (TDMA) digital techniques or code division multiple access (CDMA) digital techniques. The system, method and apparatus of the present invention can be used with these and any other wireless protocols currently available or which may later become available and specific component values and types may vary accordingly without affecting the scope of the apparatus or its intended use.

The digital signal modulator/demodulator 44 is connected to the central processor unit (CPU) 46 through the data bus and address bus. The CPU 46 is responsible for handling the protocols needed for processing a call and other call related functions such as the voice mail system. Upon receipt of a signal indicating the receiving of an outside call from the MTSO, the CPU 46 will activate an alert or alarm 48 in the form of an audio signal or vibration. A speaker/microphone 49 is coupled to the Codec 50 which is used to convert the voice data from analog to digital and digital to analog. Once the voice data is converted, the DSP (Vocoder) 52 is used to compress the output of Codec 50 in order to reduce the bandwidth of the voice data. Data may be stored in the data memory 54 and additional programmable functions may be stored in the program memory 56 until accessed.

Figure 2:
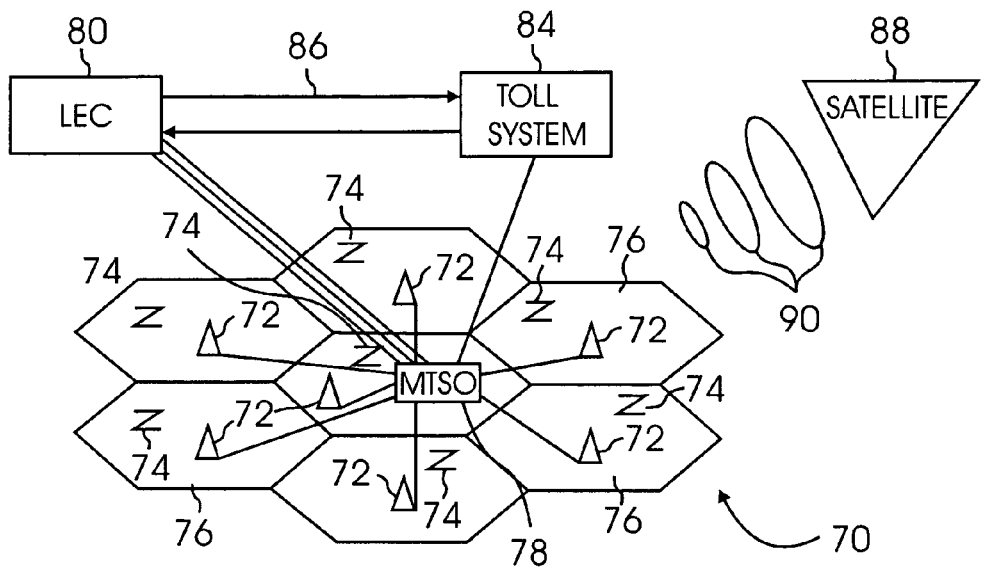
FIG. 2 is a schematic illustrating the conceptual layout of a wireless system and its relation to the public switched telecommunications network.
Figure 3:
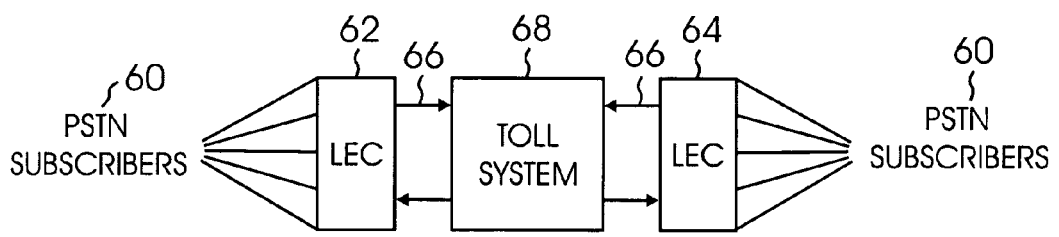
FIG. 3 is a schematic showing the conceptual layout of the public switched telecommunications network.

FIG. 2 shows a schematic illustration of the wireless system layout and its relation to the public switched telecommunications network while FIG. 3 shows a schematic of the public switched telecommunications network. In FIG. 3, there are numerous individual subscribers 60 that subscribe to the PSTN and these subscribers are linked to local exchange carriers (LEC) 62,64 and are interconnected by trunks. Toll connecting trunks 66 connect the local network 62,64 to the toll network 68. FIG. 2 shows the mobile telephone switching office (MTSO) as the heart of the wireless system for a specific serving area. The conventional wireless telecommunications switched network 70 is a network consisting of a plurality of wireless antennae 72 capable of receiving wireless band radio frequency signals 74, with each of the plurality of wireless antennae 72 being associated with a discrete cell site 76. The plurality of antennae 72 represent mobile units. The mobile units may be hand held or vehicle mounted terminals. Each of the plurality of wireless antennae 72 is electrically linked to a wireless switch 78 (the MTSO) which governs the operation of the wireless telecommunications switched network 70 and links the network 70 to a local exchange carrier 80 via T1 land lines 82. As previously described with reference to FIG. 2, the local exchange carrier 80 is connected to the toll network 84 via connecting trunks 86. Satellite means 88 may also be used to access the MTSO 78 via satellite signals 90. The MTSO 78 can then access the toll system 84 as previously described.

Figure 4:
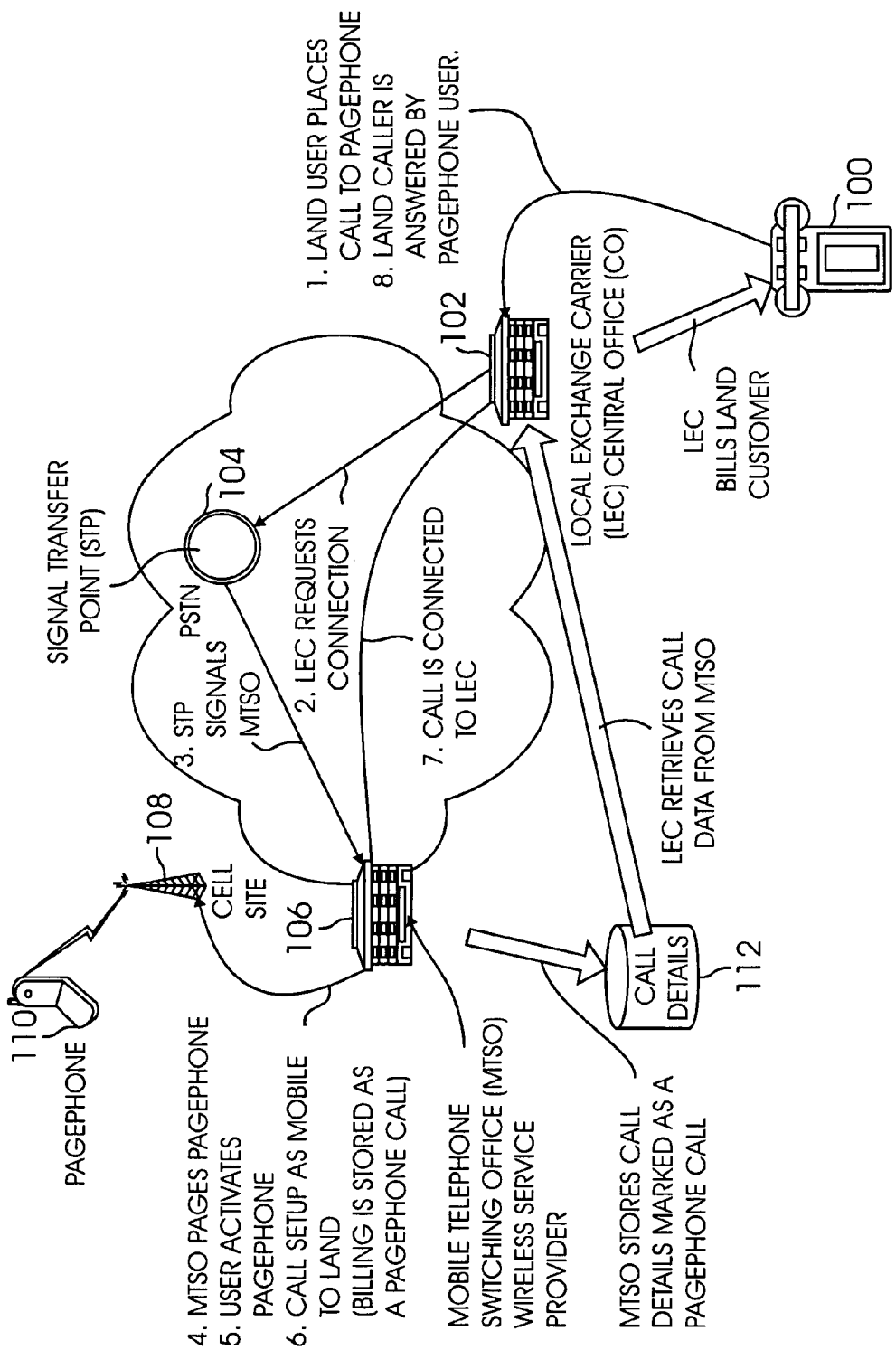
FIG. 4 is a schematic depicting a two-way wireless communication system that establishes instant two-way wireless communication between a public switched telecommunications network caller and a pagephone subscriber in accordance with the present invention.

A schematic depicting a two-way wireless communication system establishing two-way wireless communication between a public switched telecommunications network caller and a pagephone subscriber, including caller generated billing, in accordance with the present invention is shown in FIG. 4. A PSTN land caller 100 initiates a telephone call by dialing a pagephone number. The pagephone number is transmitted to the Local Exchange Carrier (LEC) 102. The LEC 102 sends a signal to the Signal Transfer Point (STP) 104 requesting connection and the STP 104 signals the Mobile Telephone Switching Office (MTSO) 106 wireless service provider. The MTSO 106 pages the pagephone via a cell site 108 of the MTSO 106 and the pagephone subscriber activates the pagephone 110 upon being alerted to the page by an audio tone or vibration emanating from the pagephone 100. Activating the pagephone 110 may constitute a simple action such as flipping open a cover element on the pagephone 110 or depressing an activation button. The call is then set up as a mobile to land call and billing is stored as a pagephone call. Once the pagephone 110 is activated, the MTSO 106 sends a signal and the call is connected to the LEC 102 so that the land caller 100 is answered by the pagephone user or subscriber.

Referring now to the caller generated billing aspect of the invention, it was previously mentioned that the MTSO 106 stores the details of the call, i.e. the call details 112, to the pagephone 118 as a pagephone call. The LEC 102 then retrieves the call details from the MTSO 106 and the LEC 102 bills the land caller 100. Alternatively, the system of the present invention may be set up to generate split billing such that the subscriber pays a set portion, or a predetermined percentage, of the call and the land caller pays for the remaining portion of the call.

Figure 5:
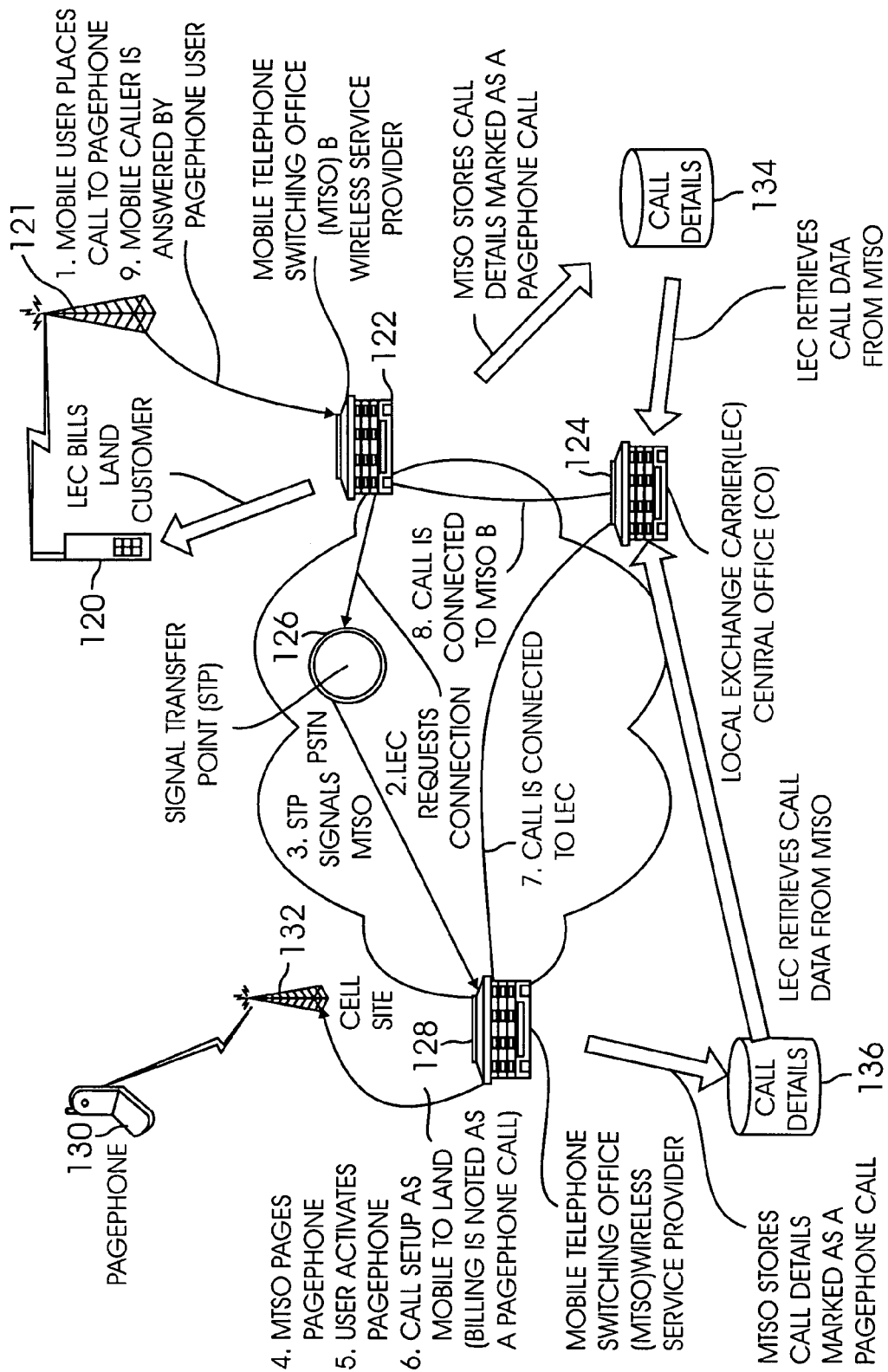
FIG. 5 is a schematic depicting a two-way wireless communication system that establishes instant two-way wireless communication between a wireless radiotelephone caller and a pagephone subscriber in accordance with the present invention.

A wireless telephone may also be used to initiate a call to the pagephone which is used with the two-way wireless communication system of the present invention. FIG. 5 is a schematic depicting a two-way wireless communication system that establishes calling party pays two-way wireless communication between a wireless radiotelephone caller and a pagephone subscriber in accordance with the present invention. The wireless (mobile) caller 120 initiates a telephone call by dialing a pagephone number. The call is received by a cell site 121 of the MTSO (B) 122, which is the mobile telephone switching office wireless service provider for the wireless (mobile) caller. The MTSO (B) transmits the signal to the local exchange carrier (LEC) 124 and the LEC 124 requests connection by sending a signal to the signal transfer point (STP) 126.

The STP 126 then signals the MTSO (A) 128 which is the mobile telephone switching office wireless service provider for the pagephone subscriber. The MTSO (A) 128 pages the pagephone 130 via a cell site 132 of the MTSO (A) 128 and the pagephone subscriber activates the pagephone 130 upon being alerted to the page by an audio tone or vibration emanating from the pagephone 130. Activating the pagephone 130 may constitute a simple action such as flipping open a cover element on the pagephone 130 or depressing an activation button. The call is then set up as a mobile to land call and billing is stored as a pagephone call. Once the pagephone 130 is activated, the MTSO (A) 128 sends a signal and the call is connected to the LEC 124. The LEC 124 sends a signal to the MTSO (B) 122 and upon the MTSO (B) receiving the signal, the call is connected to the MTSO (B) so that the wireless (mobile) caller 120 is answered by the pagephone user or subscriber.

Billing of the wireless caller 120 may occur in one of two ways. First, the MTSO (B) 122 of the wireless service provider for the wireless caller 120 may store the call details 134 of the call made to the pagephone as a pagephone call and the LEC 124 may retrieve the call data 134 from the MTSO (B) 122 and bill the wireless caller 120 through their wireless service provider. Second, the MTSO (A) 128 of the wireless service provider for the pagephone subscriber may store the call details 136 of the pagephone call. The LEC 124 can then retrieve the call data from the MTSO (B) and bill the wireless caller 120 through their wireless service provider. Alternatively, the system of the present invention may be set up to generate split billing between the subscriber and the caller such that the subscriber pays a set portion, or predetermined percentage, of the call and the wireless caller pays for the remaining portion of the call.

Figure 6:
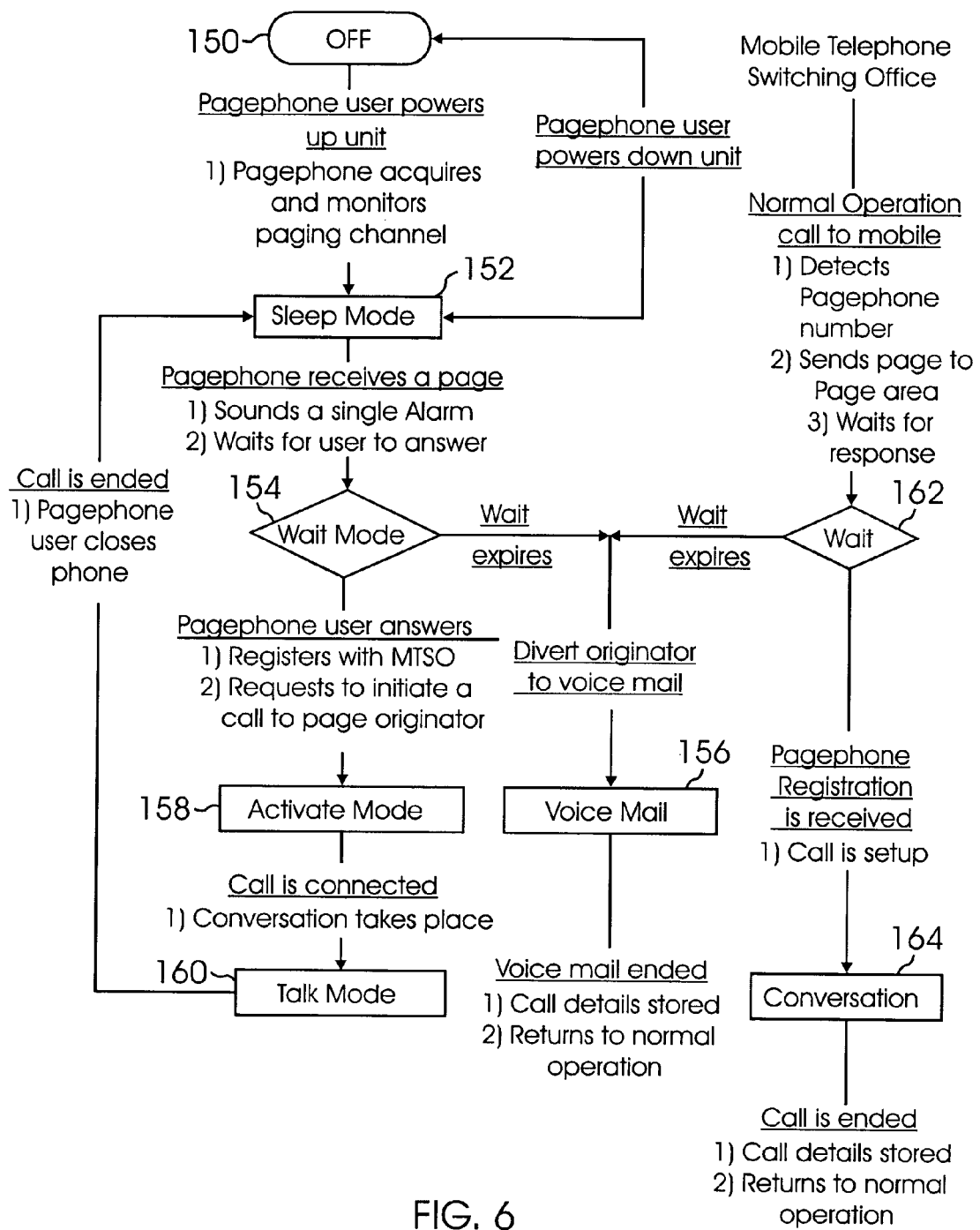
FIG. 6 is flow chart showing a first preferred method for a caller only initiated two-way wireless communication with caller generated billing in accordance with the present invention.

A flow chart showing a first preferred method for a caller only initiated two-way wireless communication with caller generated billing in accordance with the present invention is shown in FIG. 6. More specifically, this flow chart outlines the functioning for the pagephone apparatus in its prescribed system and network area. The initial function of the pagephone is virtually the same as a normal pager. In the Off state 150, no power is applied and the pagephone is unable to receive any kind of information. In order to utilize the pagephone, the pagephone subscriber powers up the unit to the Sleep Mode 152. In this mode, the pagephone acquires the paging channel timing and monitors the paging channel for incoming pages. Once the pagephone receives a page, from either a land or mobile caller, the subscriber is alerted to the page by either an audible sound or a vibration. The pagephone unit then enters the Wait Mode 154. The pagephone will then wait for a specified amount of time to allow the pagephone user or subscriber to answer the pagephone. This period will typically be a matter of seconds.

If the time period expires without an answer, the outside caller is diverted to the pagephone's voice mail system 156, which is later described in further detail with reference to FIG. 7. When the voice mail ends, the call details are stored and the pagephone returns to the Sleep Mode 152. Alternatively, if the pagephone is answered in the specified period of time, the pagephone enters the Active Mode 158. When the pagephone user answers the pagephone, it sends a registration message to the Mobile Telephone Switching Office (MTSO) in order to make its exact whereabouts known, and to request a call set up to the page originator. The page originator is preferably identified in the page message so that the pagephone user can determine whether or not they want to take the call. Once the MTSO connects the call, the pagephone enters the Talk Mode 160 during which a two way conversation takes place between the pagephone user and the call originator. Upon completion of the call, the pagephone returns to the Sleep Mode 152.

Turning now to the MTSO functions, the MTSO detects a pagephone number, sends the page to the pagephone, and then enters the Wait Period 162 to wait for a response. If a timely response is received, the MTSO sets up the call and the Conversation Mode 164 is entered. The MTSO then records and stores the call details. The caller initiating the call to the pagephone is then charged for the air time of the call.

Local pagephone calls will preferably be given priority on the paging channel in its area of coverage over normal pagers in order to ensure that pagephone calls are initiated with a page message within seconds of originating a call to the pagephone. The pagephone's Wait Mode 154 will typically range from three to five seconds. The Wait Period at the MTSO will be a similar range but will always be greater than that of the pagephone. Registration and call set up is expected to take approximately three to fifteen seconds depending upon the distance of the call and the time of day. In the event that the cellular system is loaded and the page cannot be issued instantly, the originator of the call to the pagephone will be diverted to voice mail. As an alternative to having the originating caller wait on line for the call to be connected, a "Call Back" feature may be implemented. This feature would provide the originator of the call with a message to hang up their phone and wait to be contacted. Once the pagephone receives the page and the call is connected, the originator's telephone would then call the pagephone back. This feature can be used during hours of peak load on the cellular system instead of diverting to voice mail. This feature could also be provided to the pagephone subscriber as an option provided by the service provider.

The main advantage of one embodiment of the pagephone system, method and apparatus of the present invention is that it is entirely passive and does not transmit any signals while in the Sleep Mode. Transmission is only initiated after a page message addressed to the pagephone is received and the pagephone user answers the pagephone. This transmission is to register the pagephone's existence with the MTSO and to set up the call. Therefore, the pagephone's location within the local area is unknown up to the point where it is contacted by an originating caller. This system and method will reduce the load on all other channels and prolong the life of the pagephone's battery.

However, in a preferred embodiment of the pagephone system, method and apparatus of the present invention, which is described with reference to FIGS. 19 and 20, the pagephone apparatus acts much like a cellular telephone in the standby mode in that it is periodically communicating with the network to identify its location and not just identifying its location when a call is made to the apparatus.

Figure 7:
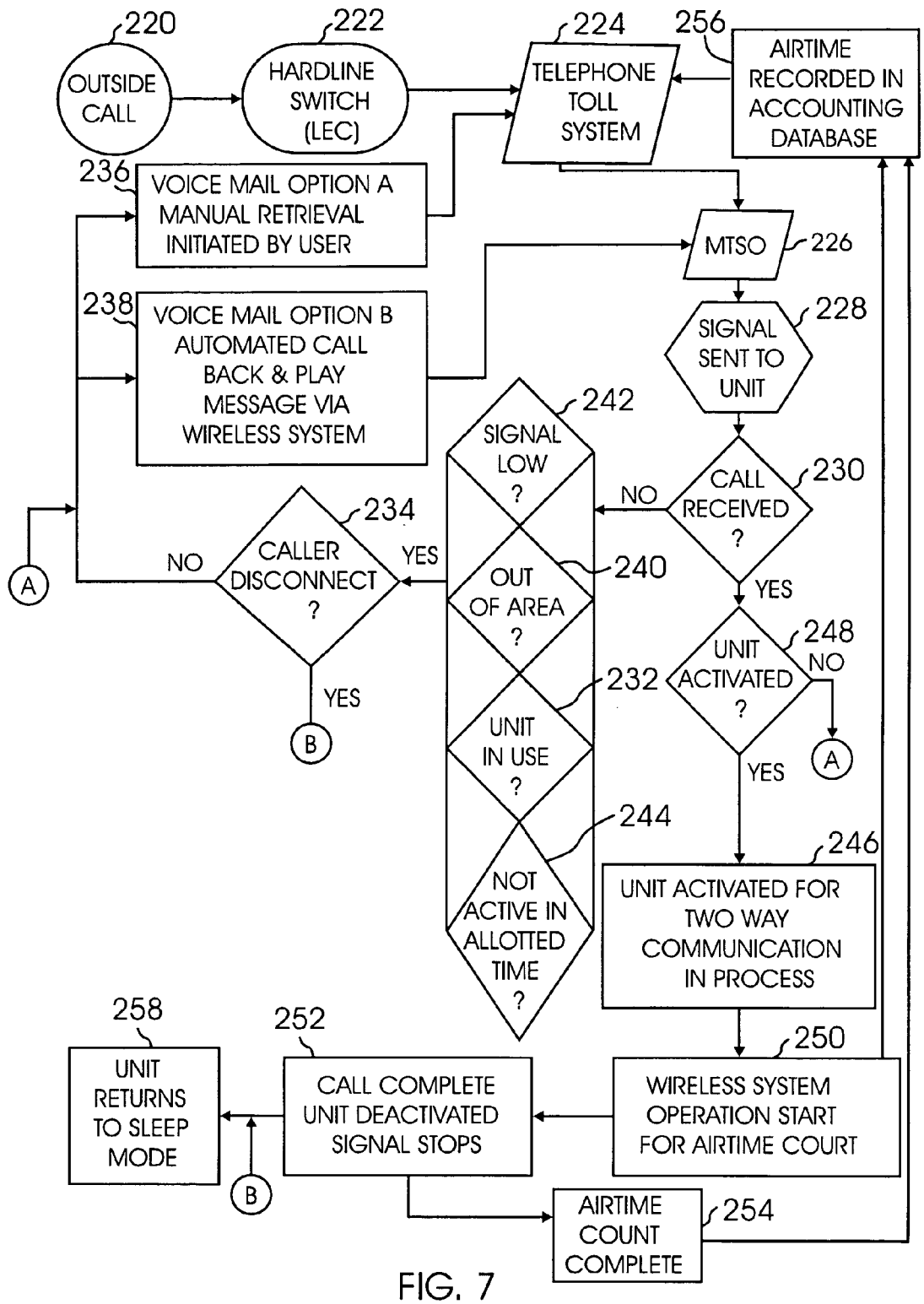
FIG. 7 is a flowchart showing a second, more detailed method for a caller only initiated two-way wireless communication with caller generated billing in accordance with the present invention.

FIG. 7 depicts a flowchart showing a second, more detailed method for a caller only initiated two-way wireless communication with caller generated billing in accordance with the present invention. Referring now to FIG. 7, an outside caller 220, either a PSTN caller or wireless caller, initiates a telephone call by calling a pagephone number. The call from the outside caller 220 is transmitted to a hardline switch or LEC 222 which is then transmitted to a telephone toll system 224. The call is then transmitted to the MTSO (wireless switch) 226 and the MTSO 226 sends a signal to a unit in step one 228.

The unit is preferably a radiotelephone transceiving apparatus in the form of a pagephone which comprises: 1) a housing with a keypad having a varying minimum number of multifunction keys which may be used to power the apparatus on and off, answer calls, terminate calls, create and send outbound data packets, and act as a human machine interface, among other things, without providing the apparatus with an ability to make a direct two-way voice communication by dialing another party's telephone number, 2) a receiving means for receiving radiotelephone signals contained within the housing, 3) transmission means for transmitting radiotelephone signals by the receiving means upon receipt of radiotelephone signals by the receiving means whereby the apparatus can only be used to supervise a two-way voice communication initiated from another telephone apparatus, 4) processing means coupled to the transmission means and receiving means for processing received signals and only transmitting radiotelephone signals in response to receipt of a signal having the correct mobile identification number of the transceiving apparatus whereby the processing means cannot create an outgoing address signal and can only produce an alert signal in response to a signal having the correct mobile identification number, and 5) means for indicating that radiotelephone signals coupled to the processing means are received.

In step two 230, the toll system 224 determines if the call was received by the unit. If the call was not received, the system 224 determines if the unit is in use 232. If the unit is in use, the system 224 has to determine if the caller has disconnected 234. The caller may be able to leave a voice mail message for the user. Two options exist for the voice mail—the voice mail can either be manually retrieved by the user of the unit 236 or the voice mail can automatically call back and play a message via the wireless system 238. With respect to the manual voice mail retrieval option, a pagephone subscriber may either access a telephone and call their page number to receive messages or, alternatively, the subscriber may manually push a "play" button on the pagephone which will play back voice mail messages that are recorded directly into the pagephone via a miniature recording system. Alternatively, the subscriber can activate a call key to request a call back from an automated or manual operator from which the subscriber can request voice mail playback with cost for delivery being born in whole or in part by the subscriber on a prepaid basis.

If the unit is not in use, the system 224 determines if the unit is out of the service area 240. If the system 224 is out of the service area, the system 224 returns to determine whether the caller has disconnected 234. If the unit is in the service area 240 the system 224 determines if the signal received by the unit is too low for transmission 242. If the signal received by the unit is too low for transmission 242, the system 224 returns to determine whether the caller has disconnected 234. If the signal received by the unit is not too low for transmission, the system 224 determines if the unit responds to the incoming signal within a predetermined time 244. If the unit does not respond to the incoming signal within the predetermined time 244, then the system 224 returns to determine whether the caller has disconnected 234.

If the unit responds to the incoming signal then the unit is activated for two-way communication between the caller and the unit subscriber 246. If the call was received by the unit and not activated 248 then the caller 220 can leave a voice mail message for the unit 236,238. If the unit is activated 248 and normal two-way communication proceeds 246, the toll system begins to count air time 250. When the call is completed the unit is deactivated 252 and the air time count is stopped 254. The total air time is calculated and recorded and billed to the outside caller's initiating telephone number 256. The unit then returns to the sleep mode 258.

The foregoing has described a simplified two way wireless communication system wherein the calling party initiates the call and pays for the call. The system does not allow for transmitting direct outgoing calls and only allows for receiving incoming calls or connecting calls via an automated or manual operator thereby reducing fraud and creating a method for use by employers and parents alike that allows for controlling costs of two-way wireless communication.

Figure 8A:
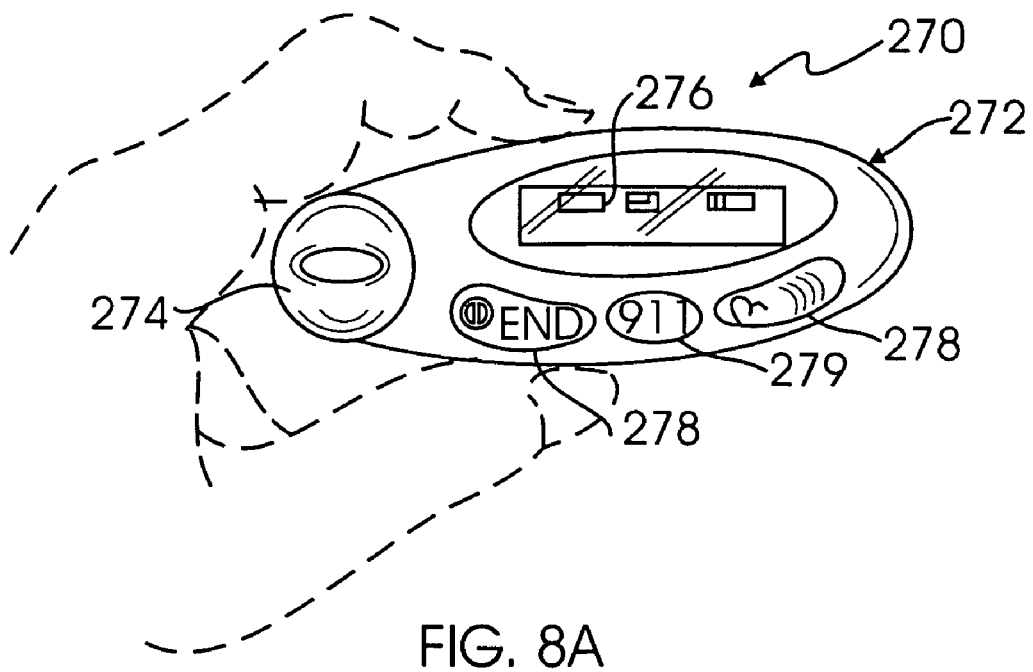
FIG. 8A is a front elevational view of one exemplary embodiment of a call receiving pager apparatus of the present invention.
Figure 8B:
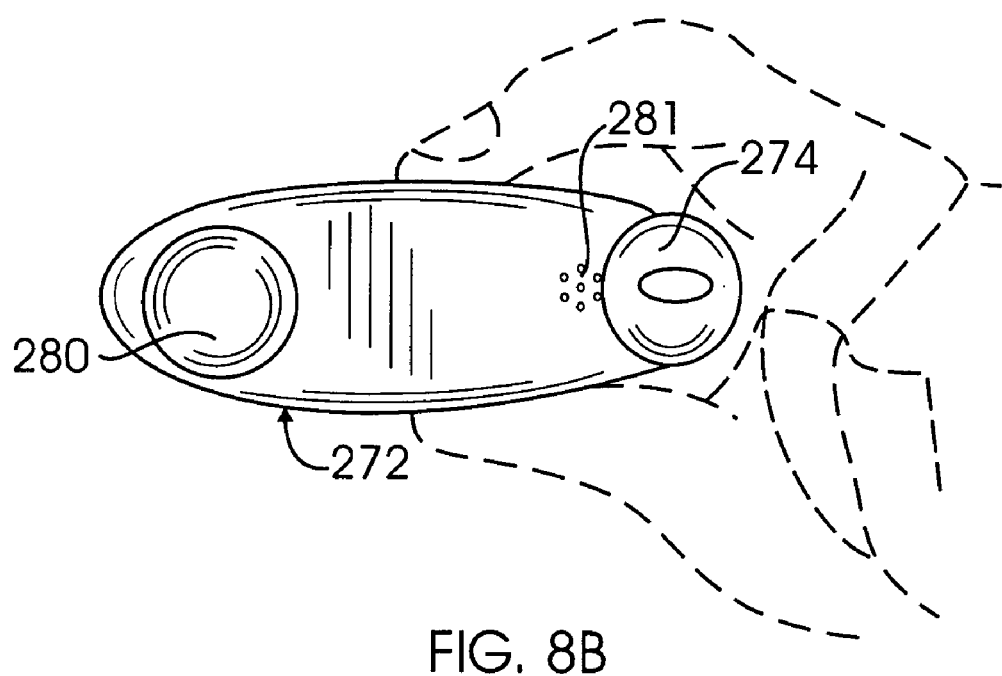
FIG. 8B is a back elevational view of the exemplary embodiment of the call receiving paging apparatus shown in FIG. 8A.

One exemplary embodiment of a call receiving paging apparatus 270 of the present invention is shown in FIG. 8A which represents a front elevational view of apparatus 270. Apparatus 270 includes a housing 272, a glow module 274 which will be later described with reference to FIG. 8E, a liquid crystal display (LCD) 276, function buttons which include at least one multifunction key 278 and one emergency call key 279. As can be seen in FIGS. 8A and 8B, apparatus 270 is designed to be small in size; in fact, so small as to be able to be held easily on its sides between a thumb and forefinger such that one half of the front and back faces of the apparatus are contained within the area between the thumb and forefinger. The size of apparatus 270 may further be referenced in relation to the size of a standard business card where the width of the apparatus 270 is equal to or less than the width of the average business card and the length of the apparatus 270 is just slightly longer than an average business card.

LCD 272 is capable of displaying alphanumeric characters in multiple languages including Cyrillic characters where local market forces require the display of such Cyrillic and other internationally recognized characters and character sets. LCD 272 is also capable of displaying a range of icons as may be specified and programmed into the apparatus 270 from time to time including, but not limited to, received cellular network strength, battery condition, and/or remaining cycle time. LCD 272 may also display intermittent icons showing the status of additional services such as received voice mail, which may be represented by an icon depicting an envelope, and calling party identification of calls made to apparatus 270.

Examples of some of the features/functions of multifunction keys 278 include, but are not limited to, 1) acting as a call key for answering incoming calls and sending outbound data packets to pre-determined destinations, 2) acting as a power on and off key, 3) acting as a call termination END key and clear key to remove text from the screen, and 4) acting as human machine interface navigation and selection/ delete keys. Emergency call key 279 is used to send a data packet to a pre-determined destination which can connect the subscribes to the appropriate emergency number directly or by way of a call back to the subscriber, i.e. "911". Key 279 is recessed to avoid accidental activation and may further require multiple key strokes with time sensitive operation to ensure avoidance of accidental activation. The number of keys on apparatus 270 may vary depending on market forces.

The human machine interface (HMI) is the visual delivery of the apparatus software configurable options and functions to the apparatus user (subscriber) through the presentation of alphanumeric characters to the LCD 272 of apparatus 270. HMI menus may be entered when the subscriber makes keystrokes on the designated apparatus multifunction keys 278. After the HMI menus are entered, the subscriber will be able to make further keystrokes which allows them to move around the options within the HMI and select or adjust the required areas of the HMI such as, but not limited to, a) user configurable apparatus functions such as volume, language of display, alert tone types, alert tone volume, key tones, etc., b) required programming data for allowing operation of the apparatus on different networks, i.e. programming of the mobile identification number, and c) connection destinations for sending outbound data packets providing data to the receiving party. Those skilled in the art will appreciate that, like computer software upgrades, the HMI will be updated throughout the life of the apparatus to offer improved efficiency to the subscriber.

Figure 8C:
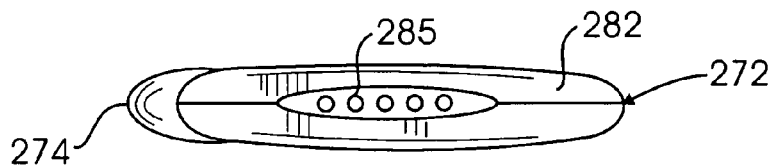
FIG. 8C is a top elevational view of the exemplary embodiment of the call receiving paging apparatus shown in FIG. 8A.
Figure 8D:
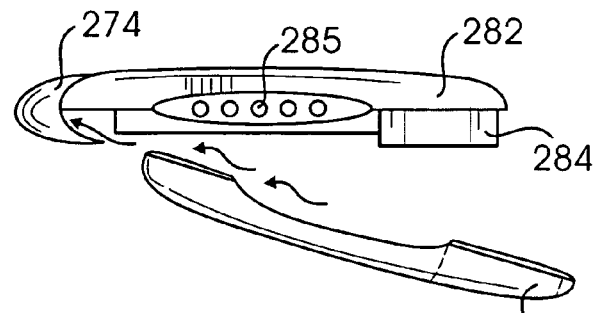
FIG. 8D is a top elevational view of the exemplary embodiment of the call receiving paging apparatus shown in FIG. 8A with the rear removable molding shown detached.

A back elevational view of apparatus 270 is shown in FIG. 8B. The back elevational view of apparatus 270 shows housing 272, glow module 274, speaker 280, and a microphone 281. FIGS. 8C and 8D show side elevational views of apparatus 270 where it can be seen that housing 272 includes front panel molding 282, removable rear panel molding 283, and center body molding 284. Center body molding 284 includes rear panel release keys 285 for releasing rear panel molding 283 to access batteries (not shown).

Figure 8E:
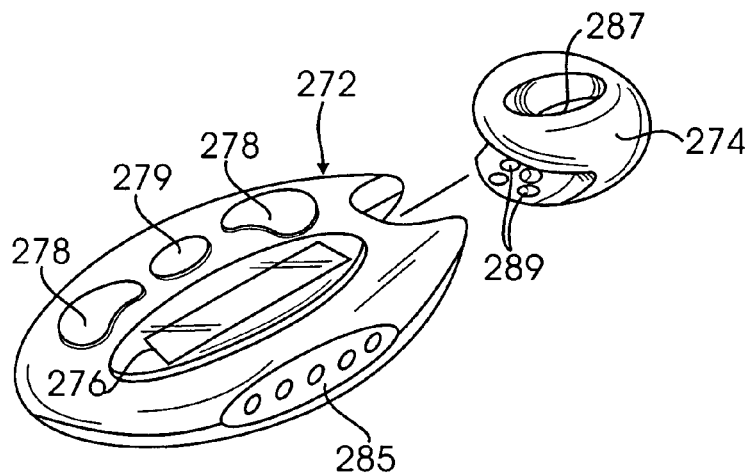
FIG. 8E is a perspective view of the exemplary embodiment of the call receiving paging apparatus shown in FIG. 8A with the optional exchangeable glow module shown detached.
Figure 9:
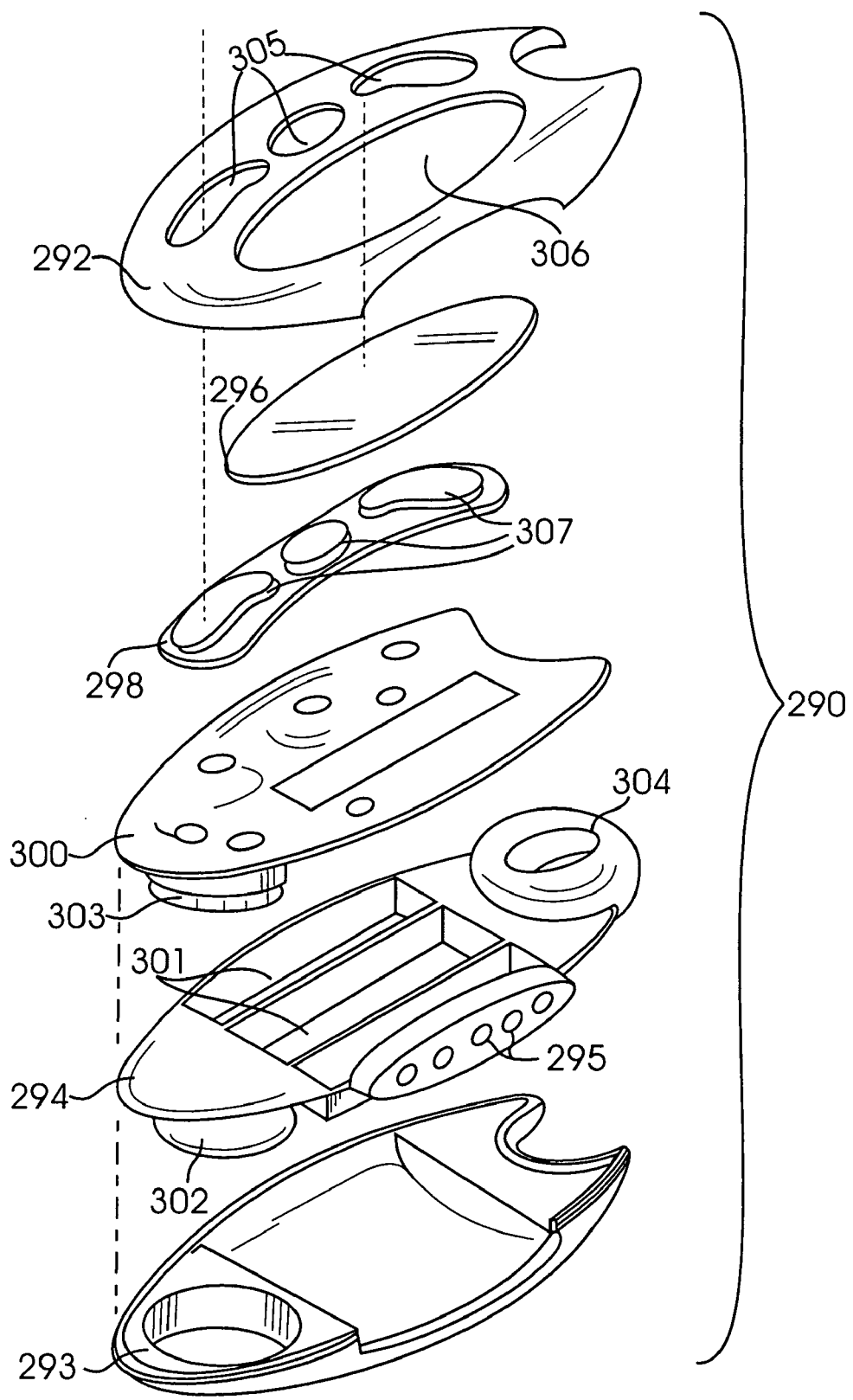
FIG. 9 is an exploded view of another exemplary embodiment of the call receiving pager apparatus of the present invention.

Turning now to FIG. 8E, it can be seen that glow module 274 is releasably connected to, and detachable from, housing 272. Alternatively, glow module 274 may be nonreleasable and comprise part of center body molding 284 as shown in FIG. 9. Accordingly, glow module 274 may or may not incorporate electronic components remote to housing 272 and may be produced from plastic or plastic composite materials like those used to produce center body molding 284. In the embodiment of apparatus 270 which includes a detachable glow module, glow module 274 is secured to center body molding 284 and rear panel molding 283 by way of center pin members 289 which fit into openings within center body molding 284 and rear panel molding 283. Rear panel molding 283 and center body molding 284 may also include pin members which are fitted into openings contained within glow module 274. Furthermore, the pin members and openings may be configured within center body molding 284, glow module 274 and rear panel molding 283 such that the glow module can only be removed when rear panel molding 283 is detached.

Glow module 274 may incorporate electronic circuitry pertaining to the illumination of glow module 274 when apparatus 270 is receiving a call from an outside caller and may also contain antenna for apparatus 270 which may be wound in a coil and positioned in glow module 274. Glow module 274 may also be fitted with a fiber optic through which light is passed when apparatus 270 is alerted and starts to ring so that the fiber will illuminate intermittently in unison with the ringing tone. This illumination may also be achieve by passing light from a light emitting diode (LED) through a prism within glow module 274 or within apparatus housing 272 through an aperture into glow module 274. When illuminated by the LED, the prism will cause a large amount of refracted light to be dispersed around glow module 274. Alternatively, an LED may be placed directly within glow module 274.

If electronic circuitry is contained within glow module 274, glow module 274 would possess contacts which would match up to corresponding contacts on center body molding 284 thereby connecting electronics within glow module 274 to a power and control source within apparatus 270 when glow module 274 is inserted into housing 272. The present invention may also include additional glow modules in various colors and shapes such as hands or cartoon caricatures thereby allowing subscribers or users to customize their apparatus 270. The center hole 287 of glow module 274 can support apparatus 270 when hung on a cord or other device or may be used to hang apparatus 270 on a hook that may be a separate belt mounted device for securing and carrying apparatus 270. Center hole 287 may also be fitted with battery charging contacts for audio input and speaker output. For example, glow module 274 could be the primary connection point for charging devices or audio accessories such as earpieces or vehicle charging cords.

FIG. 9 is an exploded view of another exemplary embodiment of the call receiving pager apparatus 290 of the present invention having a nondetachable glow module. Apparatus 290 includes front panel molding 292, center body molding 294, and removable rear panel molding 293. Apparatus 290 also includes LCD lens cover 296, key mat 298, and printed circuit board 300, all of which are disposed between front panel molding 292 and center body molding 294.

Center body molding 294 forms the framework of apparatus 290 supporting printed circuit board (PCB) 300 and other electronic components and/or circuit boards by means of snap connectors or screws of a combination of both. Center body molding 294 also supports the apparatus accumulator and front panel molding 292 which incorporates key mat 298 and LCD lens cover 296 through which alphanumeric text can be viewed on the LCD below where it is attached to PCB 300. PCB 300 can be secured to center body molding 294 by way of snap clips formed as part of center body molding 294 and/or by screw fixings. The LCD is attached to the PCB by way of conductive rubber or other connector and cable assembly. Center body molding 294 also includes side mounted release keys 295 on opposite sides of center body molding 294 which enable the release of rear panel assembly 293 when they are depressed simultaneously and the rear panel molding is pulled upwards.

Center body molding 294 also incorporates battery location slots 301 so that apparatus 290 can utilize a rechargeable battery pack or standard size alkaline cells, and speaker housing 302 which accepts the insertion of speaker 303 which is surface mounted to PCB 300. The top circumference of speaker 303 may carry a gasket which will press tight against the top of speaker housing 302 when inserted thereby avoiding conflict between the microphone and speaker functions. Alternatively, speaker 303 could be inserted in speaker housing 302 prior to connection to PCB 300 with contact between PCB 300 and speaker 303 occurring upon closure of assembly 290. The exemplary embodiment shown in FIG. 9 shows glow module 304 as being part of center body molding 294. Glow module 304 may be hollow in construction and may be formed as one piece or as a stereo module with a separate top molding. Glow module 304 is preferably semi-clear to allow for the transmission of light to pass through the module 304 during the alert process.

Front panel molding 292 is positioned over center body molding 294 and covers LCD lens cover 296, key mat 298 and PCB 300. Front panel molding 292 may be secured to center body molding 294 by way of snap connectors formed a part of center body molding 294 and/or by way of fasteners. Front panel molding 292 includes four openings; three openings 305 for keys 307 contained on key mat 298 and one opening 306 to accommodate the clear lens cover 296 through which the LCD is viewed. Key mat 298 is held inside front panel molding 292 by male to female push connectors located inside front panel molding 292 and lens cover 296 is adhered to the inside of front panel molding 292 prior to closing apparatus 290 in its final assembly. Front panel molding 292, like center body molding 294, may be made from plastics or composite plastic materials.

Removable rear panel molding 293 is designed to be removed from apparatus 290 to enable a user or subscriber to customize their device by fitting it with decorative rear panel moldings. Rear panel molding 293 mounts on apparatus 290 by attaching it to center body molding 294 and locking it into place with side release keys or other locking device 295 and other locating pins which are part of center body molding 294. The rear molding panel 293, like front panel molding 292 and center body molding 294, rear panel molding 293 may be comprised of plastic or composite plastic materials.

Key mat 298 fits inside front panel molding 292 with its three keys 307 showing through the surface of front panel molding 292 thereby allowing control and operation of apparatus 290. Key mat 298 may be formed as a one-piece incorporation of all operational keys 307 of apparatus 290 or as individual key sections. Key mat 198 is preferably comprised of a latex type material in various colors and may be laser etched and/or epoxy coated. The surface of keys 307 will be dual function and may or may not be split keys operating individual key switches located below them on PCB 300.

LCD lens cover 296 is located below opening 306 in front panel molding 292 and allows viewing of the LCD display which is mounted on PCB 300 below lens cover 296. Lens cover 296 is preferably comprised of a clear plastic and may be screen printed on its underside to reveal a company name or logo which is visible on the outside to a subscriber. Alternatively, a label could be adhered to the outer surface of lens cover 296 to achieve the same end result. Lens cover 296 is adhered to the inside of front panel molding 292 by the application of an adhesive at corresponding recess and flange lip points on the inside of front panel molding 292 and circumference of lens cover 296. Alternatively, lens cover 296 could be directly adhered to the LCD prior to front panel molding 292 being fitted as part of the assembly process.

Finally, apparatus 290 may be fitted with a specific system connector or simple 2.5 stereo jack socket (not shown) to allow for the connection of accessories and/or external data sources.

Figure 10:
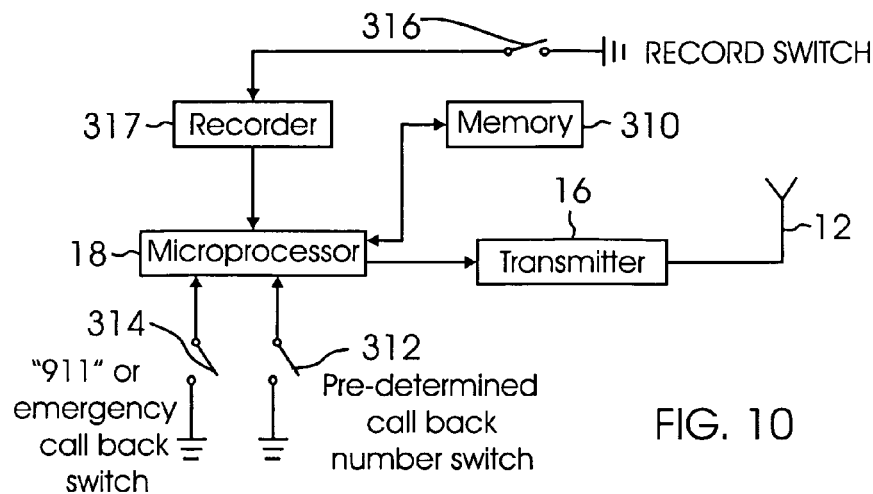
FIG. 10 is a block diagram of one example of the electronic circuitry for carrying out some of the call back request features of a call receiving pager apparatus of the present invention.

Turning now to the functions contained within, and capable of being carried out by, the call receiving pager apparatus 270 and 290, a block diagram of one example of the electronic circuitry for carrying out the call back request features of the apparatus 270 and 290 is shown in FIG. 10. A predetermined call back number, i.e. a home, office or business telephone number is entered and stored in a memory section 310 associated with microprocessor 18, which is the same microprocessor referred to in FIG. 1. This predetermined call back number will be the telephone number that is called when the predetermined call back number switch 312 is closed or activated. An emergency call back number such as "911" is also entered and stored in the memory section 310 of the microprocessor 18. The emergency call back number will be called when the emergency call back number switch 314 is closed or activated. When either the predetermined call back number switch 312 or the emergency call back number switch 314 are activated, the memory section 310 of the microprocessor 18 is accessed to obtain the stored telephone number associated with the respective switch. The retrieved telephone number is then sent to the transmitter 16, which is the same transmitter referred to in FIG. 1, so that the signal can be transmitted to the MTSO and the connection can be made between the apparatus 270 and the communication device associated with the transmitted telephone number.

A record switch 316 is connected to a recorder 317 for recording a message from the subscriber which is transmitted to the microprocessor 18 and stored in the memory section 310. The pre-recorded message contains the subscriber's name and pager number along with a request to call the subscriber's pager number in order to initiate two-way wireless communication with the subscriber. The pre-recorded message may also include an additional brief statement from the subscriber. It should also be understood by those skilled in the art that the pre-recorded voice message may instead take the form of a data message.

Upon transmission of and connection with a predetermined or emergency call back number, the memory 310 of the microprocessor 18 is accessed to retrieve the subscriber's pre-recorded voice or data message and the pre-recorded voice or data message is sent to the transmitter 16 for transmission to the predetermined or emergency call back number. The subscriber can then activate the two-way wireless communication with the predetermined or emergency number upon receiving a signal from an outside caller calling from one of those numbers by depressing the talk key which will comprise one of the multifunction keys 278 of apparatus 270.

Figure 11:
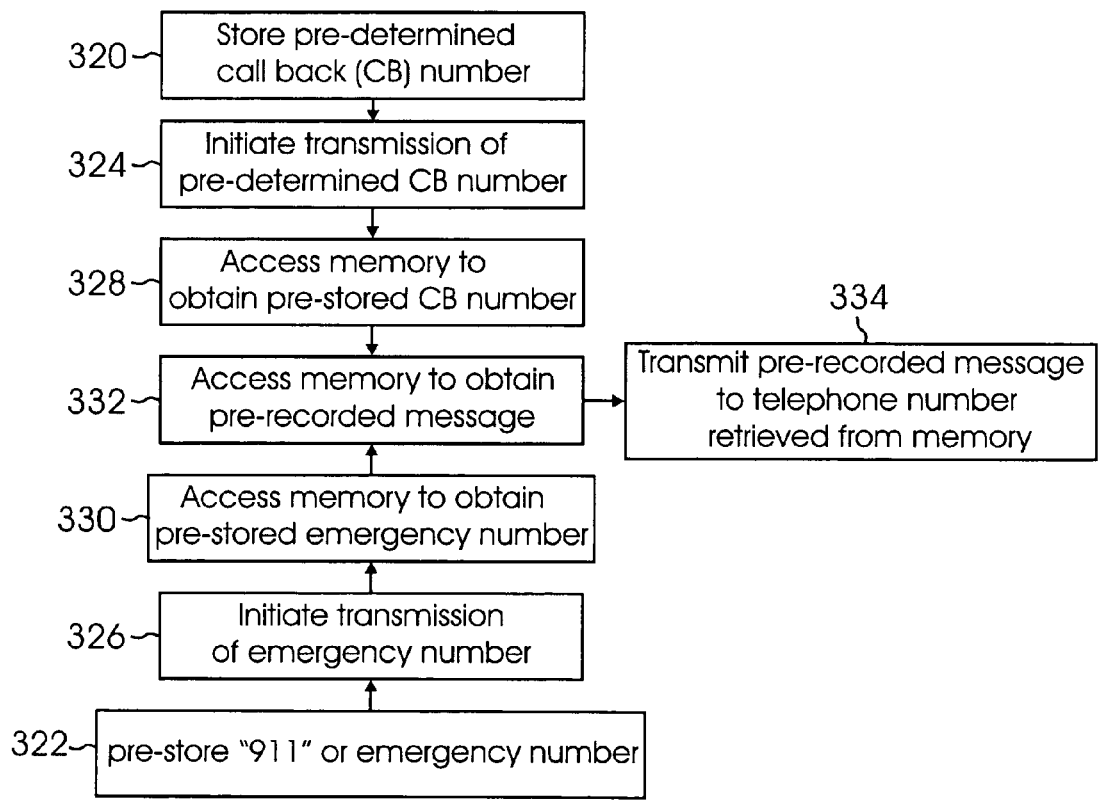
FIG. 11 is a flow diagram showing the method steps for carrying out some of the call back request features of one exemplary embodiment of the caller only initiated two-way communication system.

FIG. 11 depicts a flow diagram showing the method steps for carrying out the call back request features of the caller only initiated two-way communication system. First, as indicated in blocks 320 and 322, a predetermined call back number and an emergency number are entered and stored, respectively, in separate sections of the memory 310 of the microprocessor 18. Next, in blocks 324 and 326 initiation of the transmission of the predetermined call back number or emergency number by way of the predetermined call back switch 312 or emergency call back switch 314, respectively, results in accessing the memory section 310 of the microprocessor 18 to retrieve the stored telephone numbers associated with the switches 312 and 314 as shown in blocks 328 and 330. Then, as indicated by block 332, the memory section 310 of the microprocessor 18 is accessed to retrieve the pre-recorded voice or data message from the subscriber and the pre-recorded voice or data message from the subscriber is transmitted to the retrieved telephone number in block 334. The pre-recorded voice or data message may be retrieved from the memory section 16 of the microprocessor 18 either before or after the predetermined or emergency telephone number is transmitted and connection is made in order to transmit the pre-recorded voice or data message.

Figure 12:
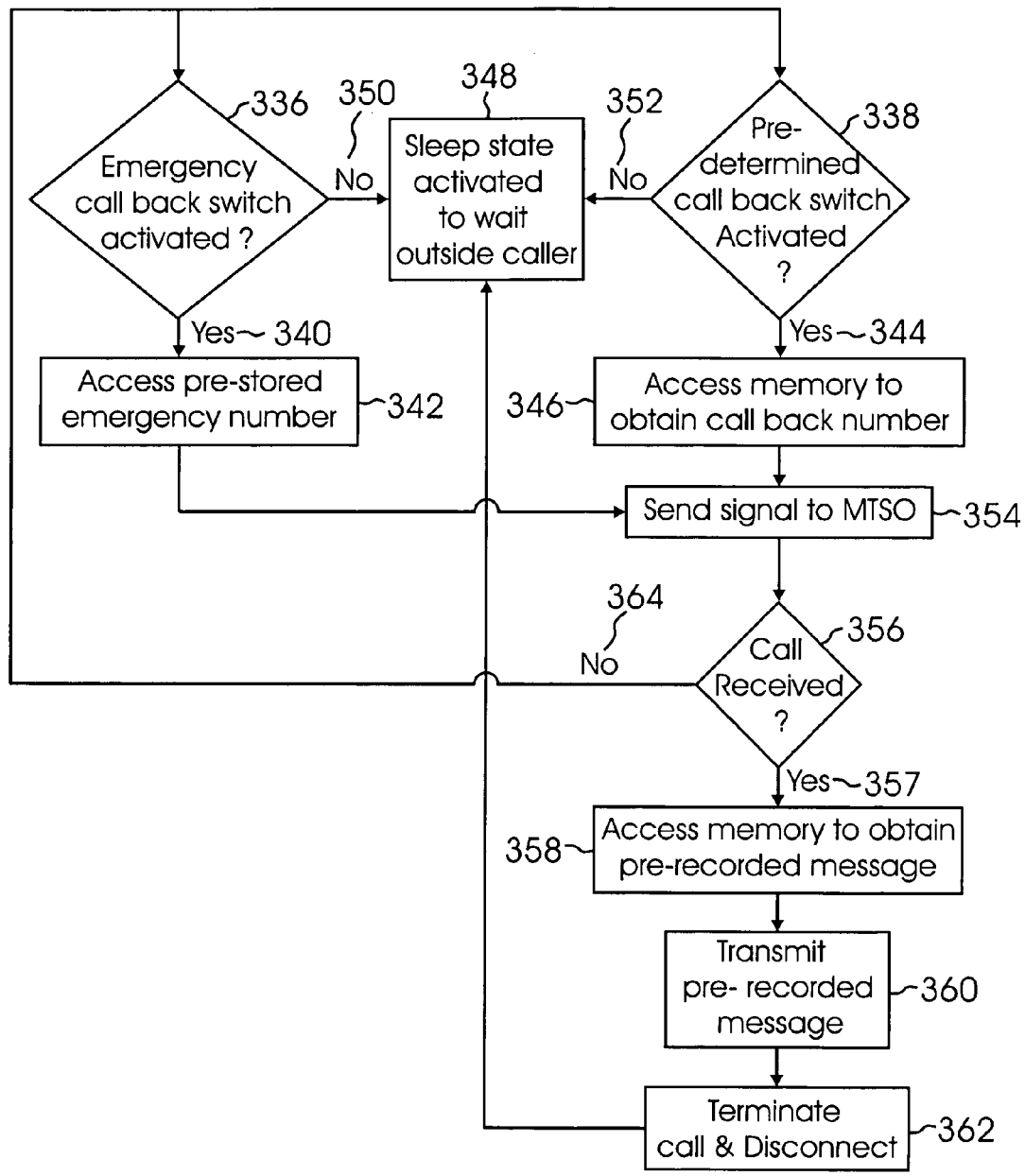
FIG. 12 is a flow chart showing a method for a call back request system used in association with one exemplary embodiment of the caller only initiated two-way communication system and apparatus of the present invention.

A flow chart showing the method for a call back request system used in association with the caller only initiated two-way communication system and apparatus is illustrated in FIG. 12. In step one, it is determined whether either the emergency call back number switch 336 is activated or the predetermined call back number switch 338 is activated. If the emergency call back number switch 336 is activated 340 then the pre-stored emergency telephone number is accessed 342 in step two or, if the predetermined call back number switch 338 is activated 344 then the predetermined call back number is obtained from the microprocessor memory 346 in step two.

As can be seen from the flow diagram depicted in FIG. 12, anyone of the emergency call back number switch 336, the predetermined call back number switch 338, or the sleep state 348 can be activated but only one of these functions may be carried out at a time. In other words, if the emergency call back number switch 336 is not activated 350, then either the predetermined call back number switch 338 may be activated 344 or the sleep state 348 may be activated to await an outside caller's page. If the predetermined call back number switch 338 is not activated 352, then either the emergency call back number switch 336 can be activated 340 or the sleep state 348 can be activated to await an outside caller's page. Finally, a subscriber may deactivate the sleep state 348 by activating either the emergency call back number switch 336 or the predetermined call back number switch 338.

In step three 354, a signal is sent to the MTSO with the signal being dependent upon which telephone number was retrieved in step two above. A connection is made between the apparatus 270 and either the communication apparatus (e.g. telephone/switch) associated with the emergency call back number or the communication apparatus (e.g. telephone/switch) associated with the predetermined call back number. A determination is made in step four 356 as to whether the connection has been made between one of the two pre-stored telephone numbers and the apparatus 270. If the connection is made 357, the memory section of the microprocessor is accessed in step five 358 to obtain and retrieve the subscriber's pre-recorded voice or data message. The subscriber's pre-recorded voice or data message is then transmitted to either the emergency call back number or predetermined call back number in step six 360. Once the pre-recorded message is transmitted, the call is terminated and disconnected in step seven 362. The system then returns to sleep state 348 to await an outside caller's return call in response to the subscriber's pre-recorded voice or data message.

If the connection between the apparatus 270 and the predetermined call back number or the emergency call back number is not made 364, either the emergency call back number switch 336 or predetermined call back number switch 338 can be activated or re-activated, or, the system may return to sleep state 348.

Figure 13:
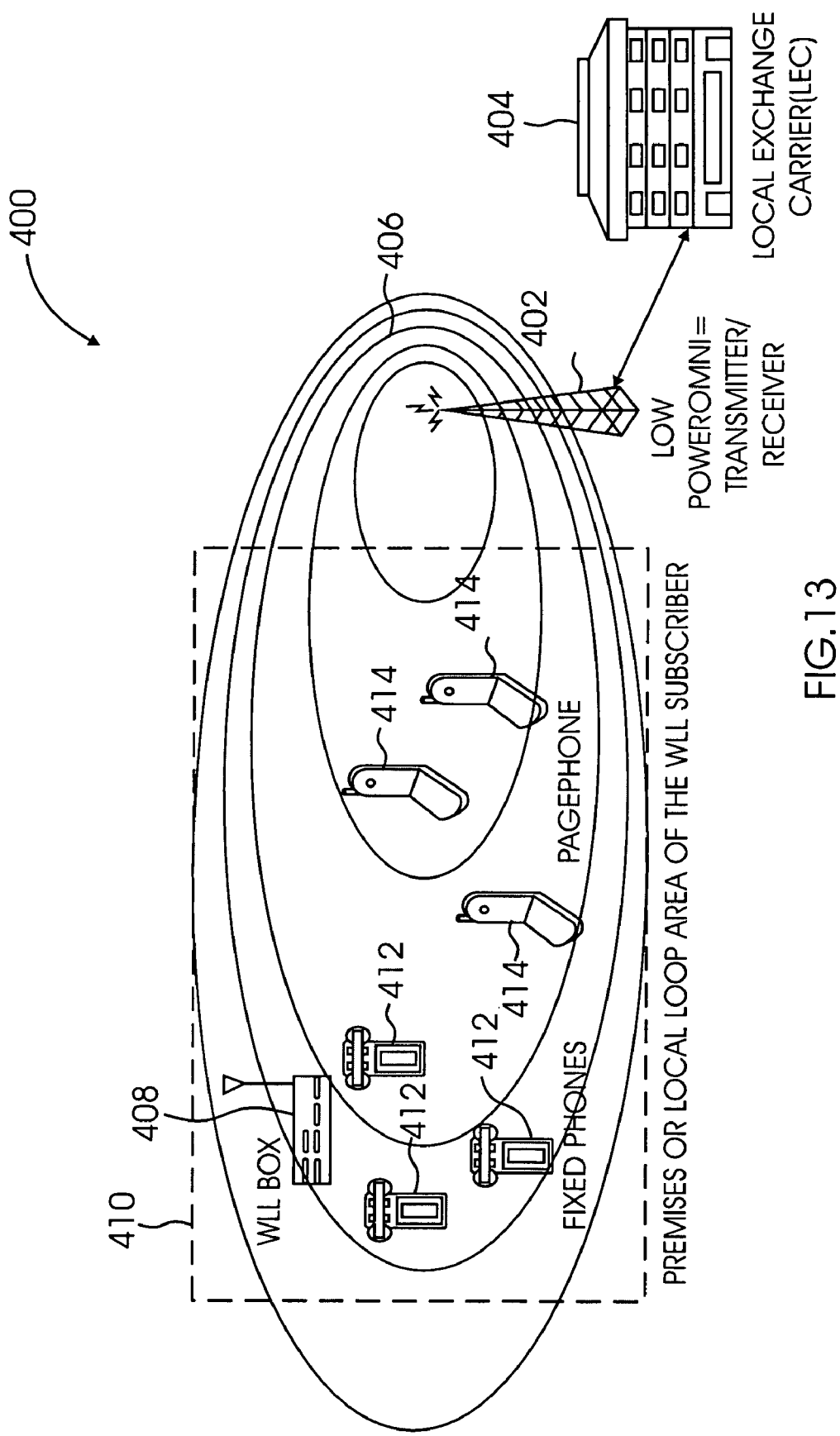
FIG. 13 is a schematic showing a wireless local loop communication system utilizing a pagephone/call receiving pager apparatus of the present invention.

FIG. 13 shows a wireless local loop system 400 which utilizes the pagephone/call receiving pager apparatus of the present invention. Low power omnidirectional radio frequency transmitter/receivers 402 are used which allow local exchange carriers 404 to provide loops 406 up to T1 (24) capacity to each wireless local loop subscriber.

Existing wireless local loops typically require the wireless local loop subscriber to install a transmitter/receiver box 408 on the premises or within the local loop area 410. Phone cable is then run from the transmitter/receiver box 408 to fixed land line telephones 412. In contrast, when pagephones or call receiving pager apparatus 414 of the present invention are utilized in a wireless local loop system 400, no such transmitter/receiver box 408 is required.

In a wireless local loop system 400, each pagephone or call receiving pager apparatus 414 operates on a dedicated frequency within the wireless local loop subscriber's premises or local loop area 410 and communicates directly with the telephone company's wireless local loop transmitter/receiver 402. It will be understood by those skilled in the art that the pagephones or call receiving pager apparatus 414 may co-exist with the local loop transmitter/receiver box 408 and fixed land line telephones 412.

The pagephones or call receiving pager apparatus 414 of the present invention may also utilize a dual mode transmitter/receiver to allow for automatic roaming from the premises or local loop area 410 to a regular cellular system. The wireless local loop 400 and cellular frequencies are preferably close in spectrum, e.g., wireless local loop 900 MHz and cellular frequency 800 MHz, for simplicity of design. The pagephone or call receiving pager apparatus 414 will monitor radio frequency (RF) power levels to determine movement from one system to another and initiate automatic de-registration and registration to the new system. Automatic de-registration and registration will not occur during a call when moving from one system to another because the two systems are distinct. The wireless local loop will always take precedence over cellular systems when the wireless local loop frequency is detected above a predefined power level.

Figure 14:
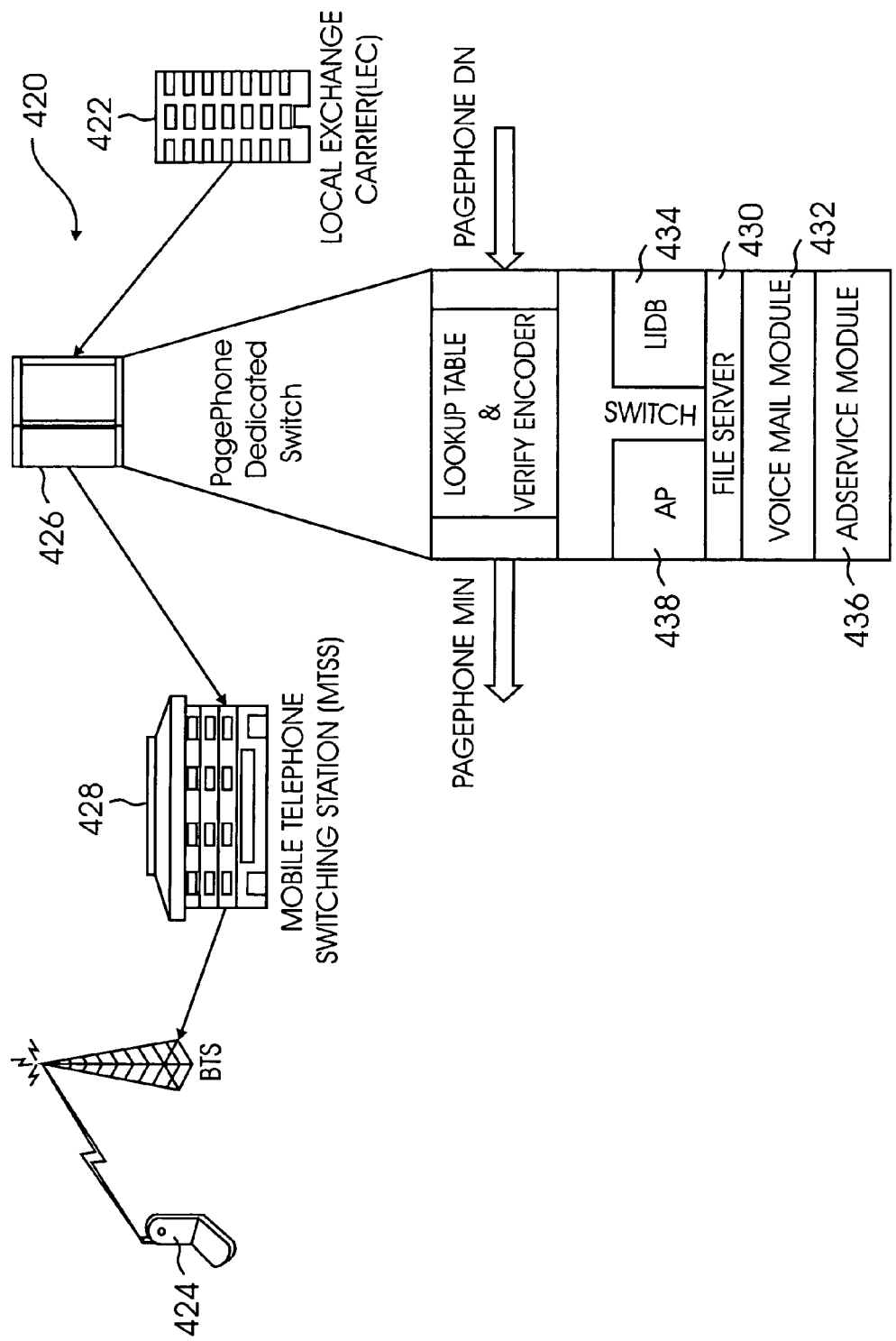
FIG. 14 is a schematic depicting one embodiment of a call receiving pager system of the present invention that establishes instant two-way wireless communication between a local exchange carrier and a call receiving pager apparatus of the present invention utilizing a dedicated switch.

Turning now to FIG. 14, a schematic depicting a call receiver paging system 420 of the present invention is shown that establishes instant two-way wireless communication between a caller through their local exchange carrier 422 and a call receiving pager apparatus 424 utilizing a dedicated switch 426. the call receiving pager system 420 utilizes dedicated switch 426 to provide proprietary access, billing functions and enhanced features including, but not limited to, calling party pays billing, selective drop in messaging, voicemail service and verification encoding.

The dedicated switch 426 provides call receiving pager apparatus 424 connectivity routed from land servicing local exchange carrier 422 to wireless service mobile telephone switching office 428. Dedicated switch 426 maintains three separate numbers for call receiving pager apparatus 424—a directory inbound dialing number (DID) to be used by callers calling the call receiving pager apparatus 424, a mobile identification number (MIN) recognized only by mobile telephone switching station (MTSO) 428, and a verification encoding signal (VES) sent by dedicated switch 426 and recognized only be call receiving pager apparatus 424.

Dedicated switch 426 is directly networked together with a file server (FS) 430, a voicemail unit (VMU) 432, a line information database (LIDB) duplicator 434, an interactive voice response unit (IVRU) 436, and an applications processor administrative front end (AP) 438. The FS 430 maintains several databases including, but not limited to, customer profiles, messaging profiles, MIN/VES/VMU lookup tables and call receiving pager apparatus service information. The IVRU 436 stores several digital audio messages including, but not limited to, calling party pays (CPP) reverse billing messages, customer status messages (CSM), and airtime discounted service messages (ADS). The VMU 432 provides personalized message storage for the pagephone caller which can only be retrieved by the call receiving pager apparatus subscriber. The VMU 432 will automatically connect to the caller when the call receiving pager apparatus subscriber does not answer the call or page or when the caller specifically chooses to enter the voice mail option.

The LIDB duplicator 434 stores information about the calling party and their local exchange carrier billing company. This database creates a record of first time callers by validation, over telephone circuits, on the nationwide LIDB network utilizing DTMF, SS7, ISDN and all future intelligent networks. The system will only revalidate the record of a repeat caller every thirty days to maintain system efficiency. The AP 438 provides the customer (subscriber) service interface to the switching system over a wide area network (WAN). The customer service department performs various provisioning tasks that include, but are not limited to, the initial DID/MIN/VES setup of the call receiving pager apparatus customers with expiration information, the demographic profile of the call receiving pager apparatus customers, the demographic profiles of the ADS advertisers and the audio file downloading of the various IVRU 436 messages.

The present invention also contemplates the use of the above described dedicated switch in all types of cellular communications including, but not limited to, standard wireless cellular telephones and standard pagers.

Figure 15:
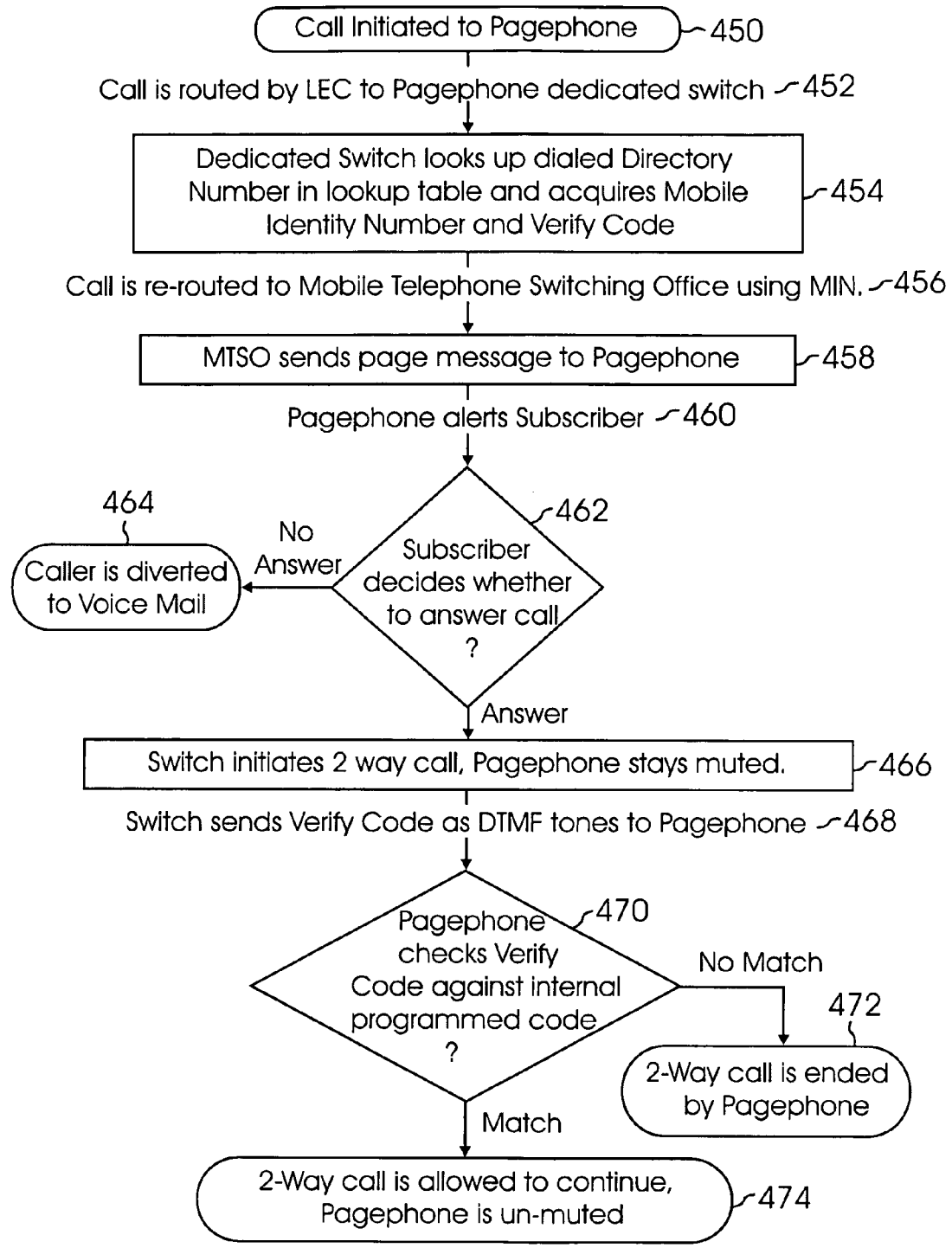
FIG. 15 is a flowchart showing one exemplary method of the present for generating direct two-way communication between a caller and a subscriber of a call receiving pager apparatus of the present invention utilizing a dedicated switch.

FIG. 15 shows a flowchart of one exemplary method of the present invention for generating direct two-way communication between a caller and a subscriber of a call receiving pager apparatus of the present invention utilizing a dedicated switch. A call is initiated 450 to the call receiving pager apparatus and is then routed 452 by the local exchange carrier to the call receiving pager apparatus dedicated switch. The dedicated switch looks up 454 the dialed directory number in a lookup table to determine its associated mobile identification number and verification code. Next, the call is re-routed 456 to the MTSO using the mobile identification number. The MTSO then sends 458 the page message to the call receiving pager apparatus and the call receiving pager apparatus alerts 460 the call receiving pager apparatus subscriber that they are receiving a page or call. The subscriber then decides 462 whether or not to answer the call.

If the subscriber does not answer the call, the caller is diverted 464 to voice mail. If the subscriber does answer the call, the dedicated switch initiates 466 direct two-way communication between the caller and the subscriber but the call receiving pager apparatus stays muted. The dedicated switch then sends 468 the associated verification code as DTMF tones to the call receiving pager apparatus. The call receiving pager apparatus then verifies 470 the code against a code that is internally preprogrammed into the call receiving pager apparatus. If the codes do not match, the direct two-way communication between the caller and the subscriber is terminated 472 before unmuting the call receiving pager apparatus. Alternatively, if the codes do match, the direct two way communication between the caller and the subscriber is allowed to proceed by unmuting 474 the call receiving pager apparatus.

Figure 16A:
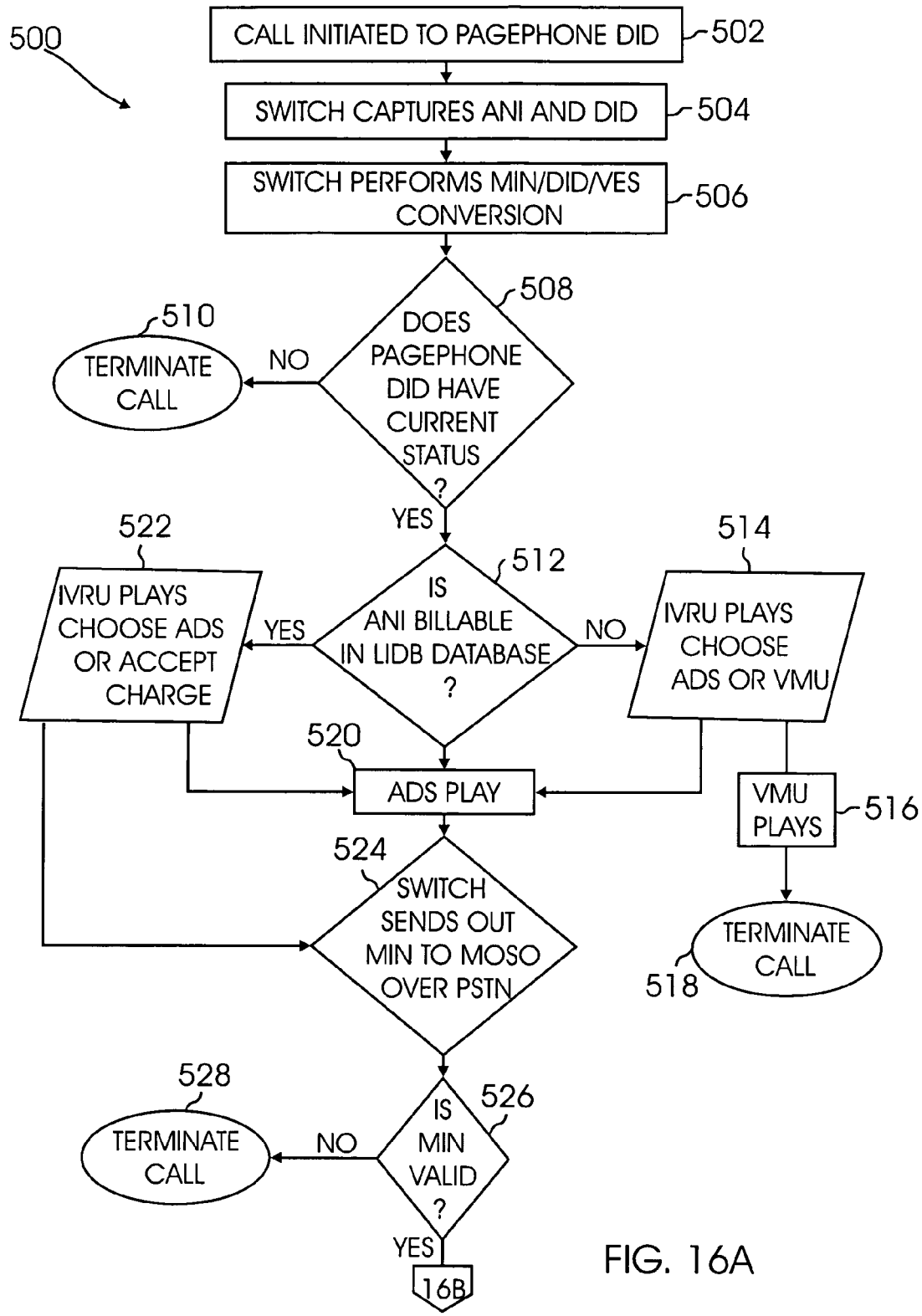
FIGS. 16A and 16B show a flowchart of another exemplary method of the present invention for generating direct two-way communication between a caller and a subscriber of a call receiving pager apparatus of the present invention utilizing a dedicated switch.
Figure 16B:
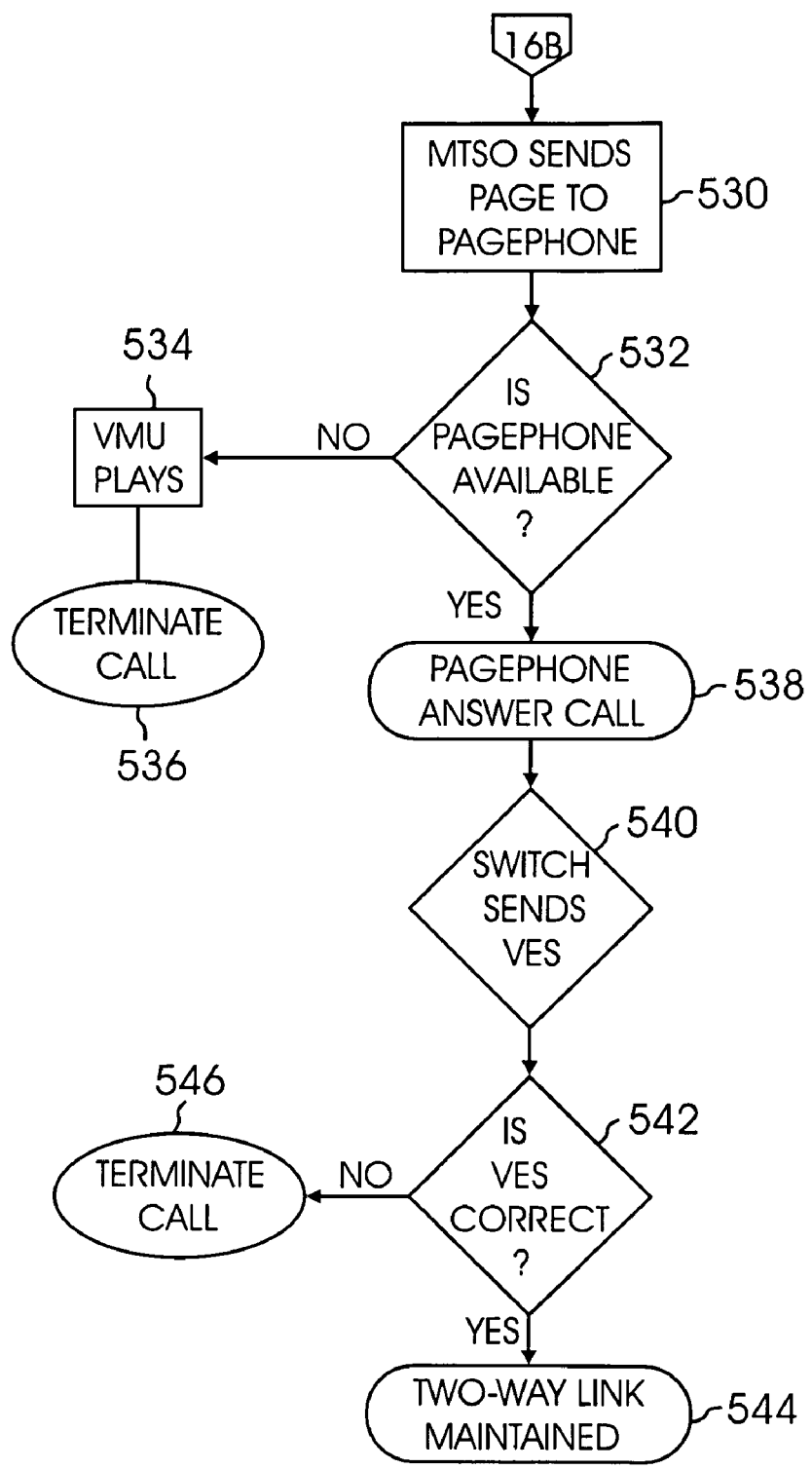

Turning now to FIGS. 16A and 16B, a flowchart is depicted showing another exemplary method 500 of the present invention for generating direct two-way communication between a caller and a call receiving pager apparatus subscriber utilizing a dedicated switch. First, in step one 502, a call is initiated to the pagephone's DID. The dedicated switch then captures the automatic number identification (ANI) of the calling party and the subscriber's DID in step two 504. In step three 506, the dedicated switch performs MIN/DID/VES conversion and the in step four 508, a determination is made as to whether or not the pagephone has current status. If the pagephone does not have current status, the call is terminated in step five 510. However, if the pagephone does have current status, a determination is made in step six 512 as to whether the ANI is billable in the LIDB database. If the ANI is not billable (i.e. ANI is a payphone or hotel phone), the IVRU will play a message to the caller in step six 514 indicating that the caller has a choice to either hear airtime discount service (ADS) advertisements or be connected directly to the VMU. If the caller request to be connected to the VMU, the VMU plays in step seven 516 and the call is then terminated in step eight 518. If the caller elects to hear the ADS advertisements, the ADS advertisements are played in step nine 520.

On the other hand, if the ANI is billable (i.e. ANI is a home or office phone), the IVRU will play a message to the caller in step ten 522 to indicating that the caller has a choice to either accept the per minute toll charge and have it directly billed to their local telephone bill or hear the ADS advertisements. If the caller elects to hear the ADS advertisements, the ADS advertisements are played in step nine 520 and the dedicated switch then sends out the MIN to the MTSO over the PSTN in step eleven 524 after the ADS advertisements are played. However, if the caller elects to accept the toll charge, the dedicated switch immediately sends out the MIN to the MTSO over the PSTN as in step eleven 524.

Once the MIN is sent to the MTSO, the MTSO determines if the MIN is valid in step twelve 526. If the MIN is not valid, the call is terminated in step thirteen 528. However, if the MIN is valid, the MTSO sends a page to the pagephone in step fourteen 530. A determination is made in step fifteen 532 as to whether the pagephone is available. If the pagephone is not available, the VMU plays in step sixteen 534 and the call is terminated in step seventeen 536 after the VMU is played. Alternatively, if the pagephone is available, the subscriber answers the call in step eighteen 538. The dedicated switch then sends the verification code (VES) to the pagephone in step nineteen 540. If the VES is determined in step twenty 542 to be correct, two way direct communication is enabled between the caller and the subscriber in step twenty-one 544. However, if the VES is determined to be incorrect in step twenty 542, the call is terminated in step twenty-two 546.

Figure 17:
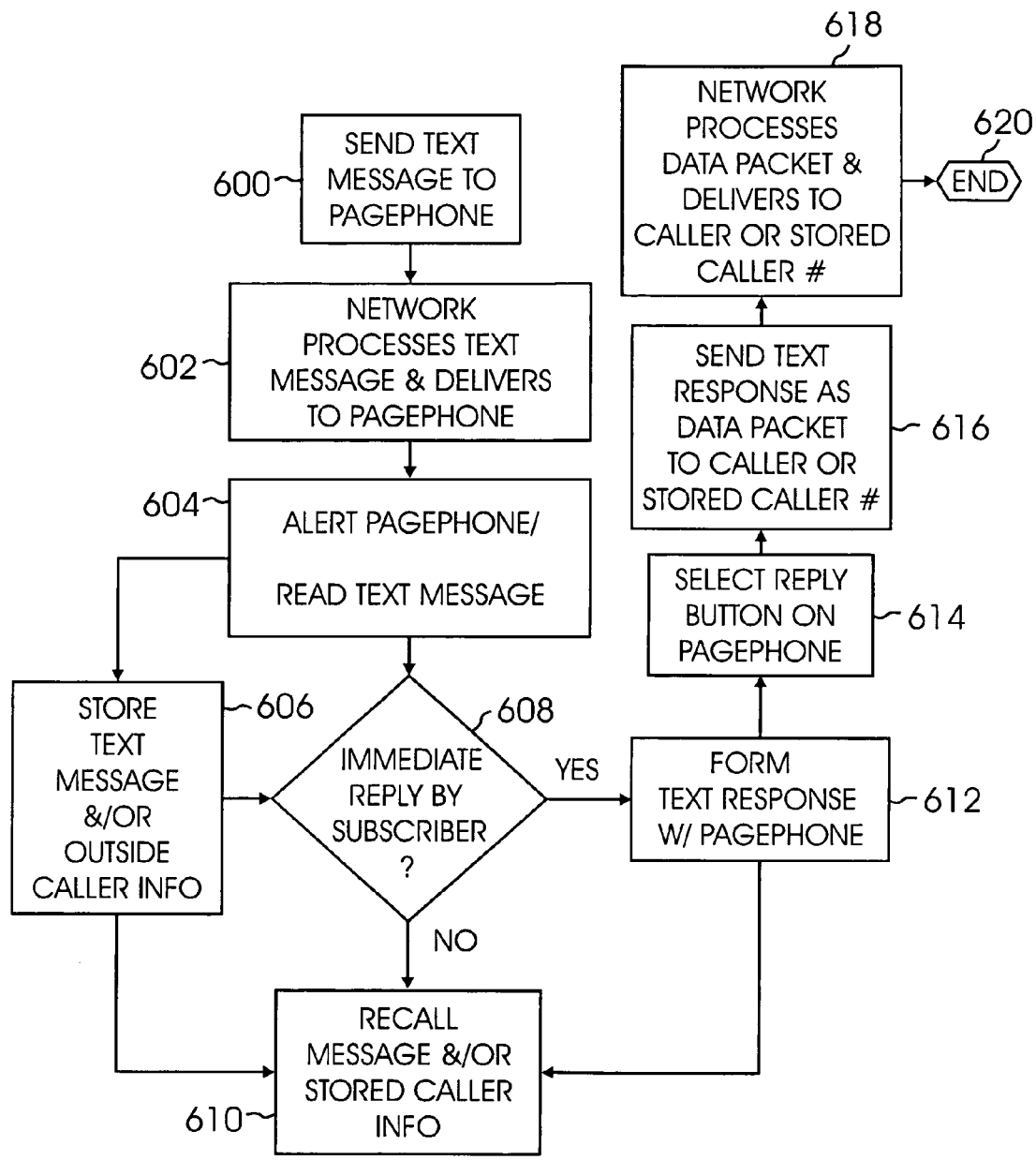
FIG. 17 is a flow diagram showing the method steps for carrying out two-way text messaging with a call receiving paging apparatus of the present invention.

FIG. 17 depicts a flow diagram showing the method steps for carrying out two-way text messaging with the call receiving pager apparatus of the present invention. The method will allow mobile telephone users having message enabled cellular networks with suitable handsets offering message formation and transmit ion capabilities to form text messages on their mobile telephone handsets. The mobile telephone user enters the mode in their handset for preparing and sending text messages and forms (or types) the content of the message they wish to send and the designated identification number of the pagephone unit to which they wish to send their text message. After forming the text message using the mobile telephone handset keypad and/or menu selections, the mobile telephone user, i.e. outside caller, sends the text message to the pagephone's identification number in step 600. Next, in step 602, the cellular telephone network of the mobile telephone user receives and processes the message through wired and wireless means as usual and delivers it to the cellular network designated to deliver calls to the pagephone's designated identification number. The message is sent as a data packet which contains the text message intended for the pagephone subscriber as well as other data pertaining to the identification of the outside caller and the outside caller's processing network(s).

Upon receiving the data packet, the pagephone will alert the pagephone subscriber that a text message has been received and the pagephone subscriber will use the pagephone's multi function key mat buttons to read the received text message and the outside caller's mobile telephone number in step 604. Then, in step 606, the pagephone subscriber will have the option of storing the received text message and outside caller's telephone number within the on board built in memory chips of the pagephone handset for recall and/or deletion at a later time or date.

In step 608, the pagephone subscriber elects to reply immediately or reply at a later time or date. If the pagephone subscriber elects to reply at a later time or date, the outside caller's telephone number is retrieved, along with the outside caller's text message if the message was also saved, from the information stored in the pagephone in step 610.

The pagephone unit may include a built in alphanumeric key mat which will allow the pagephone subscriber to create text messages on the pagephone unit's LCD screen. The alphanumeric key mat will not allow for calls to be directly made to an outside telephone number without going through a manual or automated operator. In addition, the pagephone user may also create text messages via the human machine interface by using the multi function key mat buttons to scroll through alphanumeric characters/numbers. The alpha key board used by the pagephone subscriber to form text messages may be integral to the pagephone itself or may comprise a separate device which is connected to the pagephone by a serial data socket or other input socket so that information can be programmed into the unit.

If the pagephone subscriber elects to reply immediately, the pagephone subscriber forms a text response using the pagephone in step 612 and then selects the reply button on the pagephone in step 614.

When replying, the pagephone unit sends a data packet to the outside caller who initiated the original text message, or to the outside caller number that is retrieved from stored outside caller numbers as indicated in step 616. The data packet contains the text message created by the pagephone subscriber as well as the outside caller's mobile telephone number. The data packet is then transmitted by the pagephone and received by the cellular network designated to receive calls from the pagephone. The network them processes and delivers the data packet to the outside caller in step 618. At this point, the two-way text messaging may end as indicated in step 620 or, alternatively, the outside caller receiving the text message from the pagephone subscriber may in turn send another text message to the pagephone subscriber as in step 600 thereby starting the entire text messaging cycle over again. This process can then be repeated to allow an ongoing text conversation to continue for an undetermined period of time.

The two-way text messaging of the present invention does not allow for real time live two-way communication between parties but instead only allows for the pagephone to connect to the cellular network for a sufficient amount of time for the network to receive a data packet from the pagephone which then returns to its standby mode to await incoming calls. The cost for this two-way text messaging system may be born in part or in whole by the pagephone subscriber on a prepaid or account basis.

Figure 18:
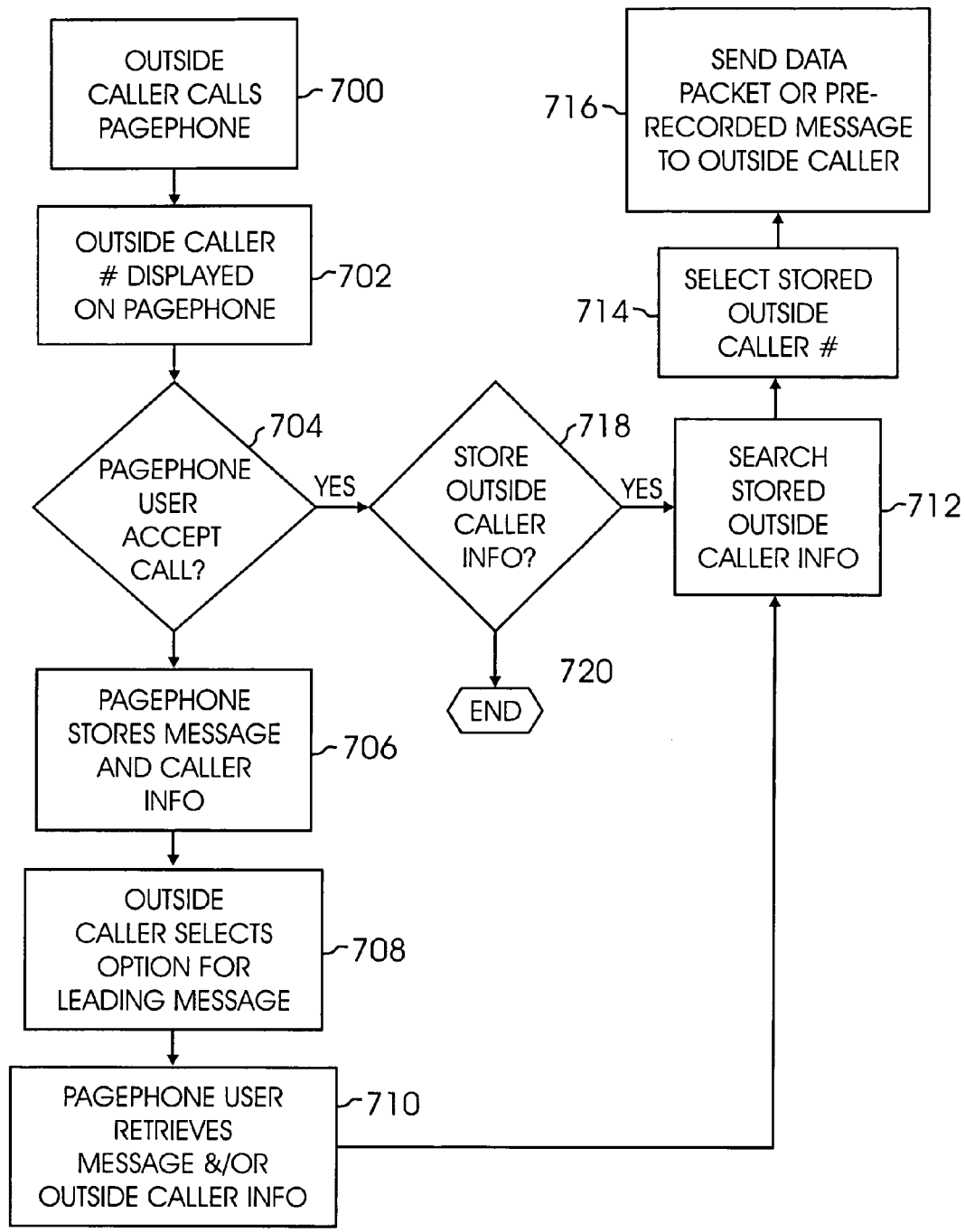
FIG. 18 is a flowchart showing a method for storing and recalling messages and call number information relating to calls made to a call receiving paging apparatus of the present invention.

Turning now to FIG. 18, there is shown a method for storing, retrieving and recalling calls to the call receiving pager apparatus or pagephone made by outside callers. An outside caller makes a call to the pagephone in step 700 and the outside caller's telephone number is displayed on the pagephone's LCD in step 702. Once the pagephone subscriber has had a chance to view the telephone number and identity of the caller, the pagephone subscriber elects whether or not to accept the call in step 704.

If the pagephone subscriber elects to not accept the call in step 704, the pagephone stores the outside caller's message and telephone number in step 706. Before, during, or after the outside caller's information is stored, the outside caller is given a menu of options to select from in step 708 which include, but are not limited to, a) the option to leave a voice mail message which can later be retrieved by the pagephone subscriber, b) the option to elect a predetermined text prompt which allows the outside caller to select from several predetermined messages such as, for example, call home, call the office, etc., or c) the option to leave a text message if the outside caller is calling from a communication device which allows for the creation of text messages. Since the pagephone subscriber did not immediately accept this call in step 704, the pagephone subscriber will later retrieve this message and outside caller information in step 710 when they retrieve their messages.

If the pagephone subscriber retrieves their messages in step 710 and then wants to return a call related to one of the messages or, alternatively, wants to make contact with any of the other previously stored numbers in the pagephone's storage base which relate to caller numbers which previously called the pagephone, the pagephone subscriber can search the stored outside caller information in the pagephone's stored database in step 712 and select a stored outside caller number is step 714. Then, in step 716, the pagephone subscriber can send a pre-recorded voice mail message to the outside caller selected in step 714 or, alternatively, the pagephone subscriber may create and send a text message to the outside caller in accordance with the method steps set out in reference to FIG. 17 which relates to two-way text messaging between an outside caller and a pagephone subscriber.

If, on the other hand, the pagephone subscriber elects to accept the call from the outside caller in step 704, the pagephone subscriber can then elect whether or not they want to save the outside caller information, i.e. the outside caller's telephone number, by storing it in step 718 for future use or reference. If the pagephone subscriber elects not to save the outside caller's information, the method of the present invention for storing and receiving calls ends in step 720. If the pagephone subscriber does elect to save the outside caller information in step 718, it should be noted that this information can be saved before, during, or after the live two-way communication that takes place between the outside caller and the pagephone subscriber as a result of the pagephone subscriber electing to accept the call.

Once the outside caller information is stored in step 718, the pagephone subscriber may later search the pagephone stored database in step 712, select a telephone number from that database in step 714, and then send either a prerecorded voice message or text message to the outside caller in step 716.

As previously described, this method involves storing telephone identification numbers as part of the incoming call receiving process. Once the telephone numbers are stored, they may be searched and selected by making key strokes on the unit key mat buttons of the pagephone in order to contact an outside caller by leaving a voice or text message for the outside caller. The outside caller numbers are stored by using built in memory chips and the pagephone subscriber will store the numbers by using the pagephone's multi function key mat buttons in responding to a prompt from the pagephone asking whether or not to store the number or by using the pagephone's human machine interface via the multi function key mat buttons.

The cost for sending a voice or text message to retrieved outside caller numbers may be charged in part or in whole to the pagephone subscriber on a prepaid or account basis.

Figure 19:
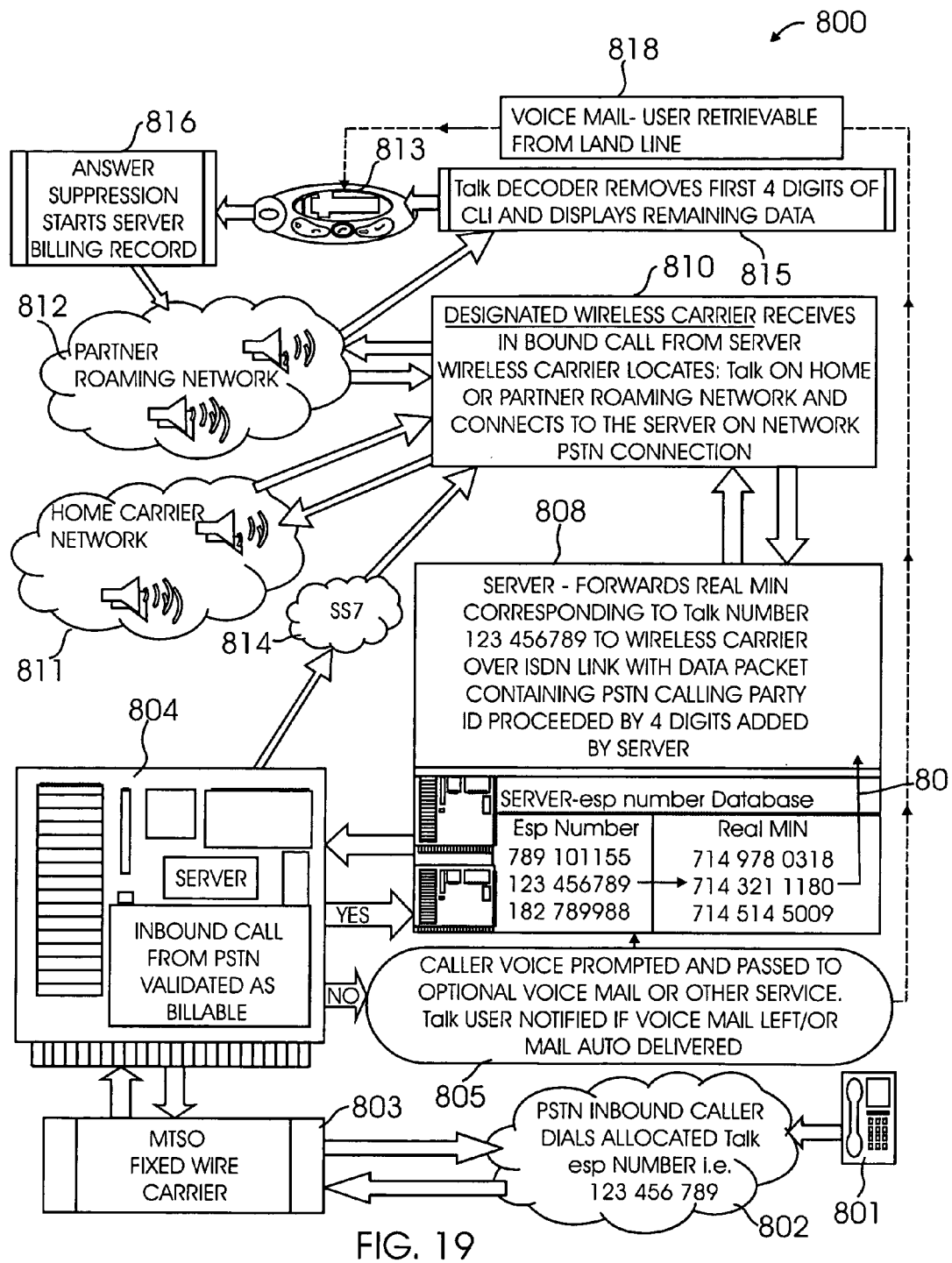
FIG. 19 is a schematic showing a preferred embodiment of the inbound call process of a call receiving pager system of the present invention having a dedicated switch.

An inbound call process for one exemplary embodiment of the call receiving pager system 800 of the present invention using a dedicated switch is shown schematically in FIG. 19. A caller from the PSTN, e.g. a caller from a phone 801, dials the pagephone apparatus telephone number in step 802 which is then sent to the fixed wire carrier 803. The fixed wire carrier 803 then directs the call to a dedicated switch 804 which determines whether or not the inbound call from the PSTN is billable. If the inbound call is coming from a communication device which cannot be billed, such as a pay telephone, the caller from the PSTN receives a voice prompt in step 805 which enables the PSTN caller to choose among several options including, but not limited to, 1) the chance to not be billed and still have the call connected to the pagephone subscriber in exchange for listening to certain advertisements such as airtime discount services, 2) the chance to leave a voice mail, and 3) the chance to leave a text message to the subscriber.

If the PSTN caller can be billed for the call, the PSTN caller can elect to leave a voice or text message with the pagephone subscriber in step 805. When a pagephone designated call number (DID) is called by an outside caller, the call will be directed via the LEC to the dedicated switch. When the dedicated switch receives the call, the caller will be identified by searches in the LIDB or other databases and the switch will determine if the call is billable in step 804. If the call is billable, the switch will look into its database and search for the real mobile identification number (MIN) of the pagephone to which the DID received number is attached in step 806. The call is then forwarded with a the correct MIN to a wireless carrier over ISDN link with an ANI data packet containing the PSTN calling party identification preceded by four digits added by the dedicated switch in step 808 which act as a random or preset encryption, and which alert the pagephone apparatus to "wake up" upon their receipt.

The designated wireless carrier receives the in bound call from the dedicated switch in step 810 and the wireless carrier then locates the pagephone apparatus 813 on the home carrier network 811 or the partner roaming network 812. Once the pagephone apparatus is found, the designated wireless carrier connects to the dedicated switch on the network PSTN connection. SS7 814 is known as a network which allows access to all information in the wireless industry and acts as an interface between the dedicated switch 804 and the designated wireless carrier to facilitate the location connection of the designated wireless carrier to the dedicated switch 804.

When the pagephone apparatus 813 receives the information from the designated wireless carrier and removes in step 815 the first four digits of the number that was used to call the pagephone apparatus 813. The remaining data, which should include the telephone number of the PSTN caller number, is then displayed on pagephone apparatus 813. The pagephone subscriber can then view the telephone number from where the caller is calling and, if the subscriber decides to receive the call, press the answer option on the pagephone apparatus 813 in step 816 to begin recording a billing record. This system allows the dedicated switch to contact the pagephone apparatus using a real MIN without the need for the outside calling party to ever know the real MIN of the pagephone. The outside calling party only needs to know the DID number of the pagephone. This method prevents fraud as outside callers cannot cause ring around by contacting a pagephone directly since they will not know the real MIN of the pagephone. Further, the pagephone sill only accept alert when it receives its real MIN preceded by the correct four digits as added by the dedicated switch.

Furthermore, if the PSTN caller chose to leave a voice mail in step 805, the voice mail becomes retrievable from a land line communication device as well as the pagephone apparatus as indicated in step 818. The pagephone user depresses the talk key which may comprise one of the multifunction keys of the apparatus and sends a data packet to the dedicated switch. The switch will call back the pagephone upon receipt of the data packet and offer the subscriber a number of voice prompts including, but not limited to, "retrieve mail". The subscriber then selects the appropriate selection utilizing speech recognition and their mail is replayed to them.

Figure 20:
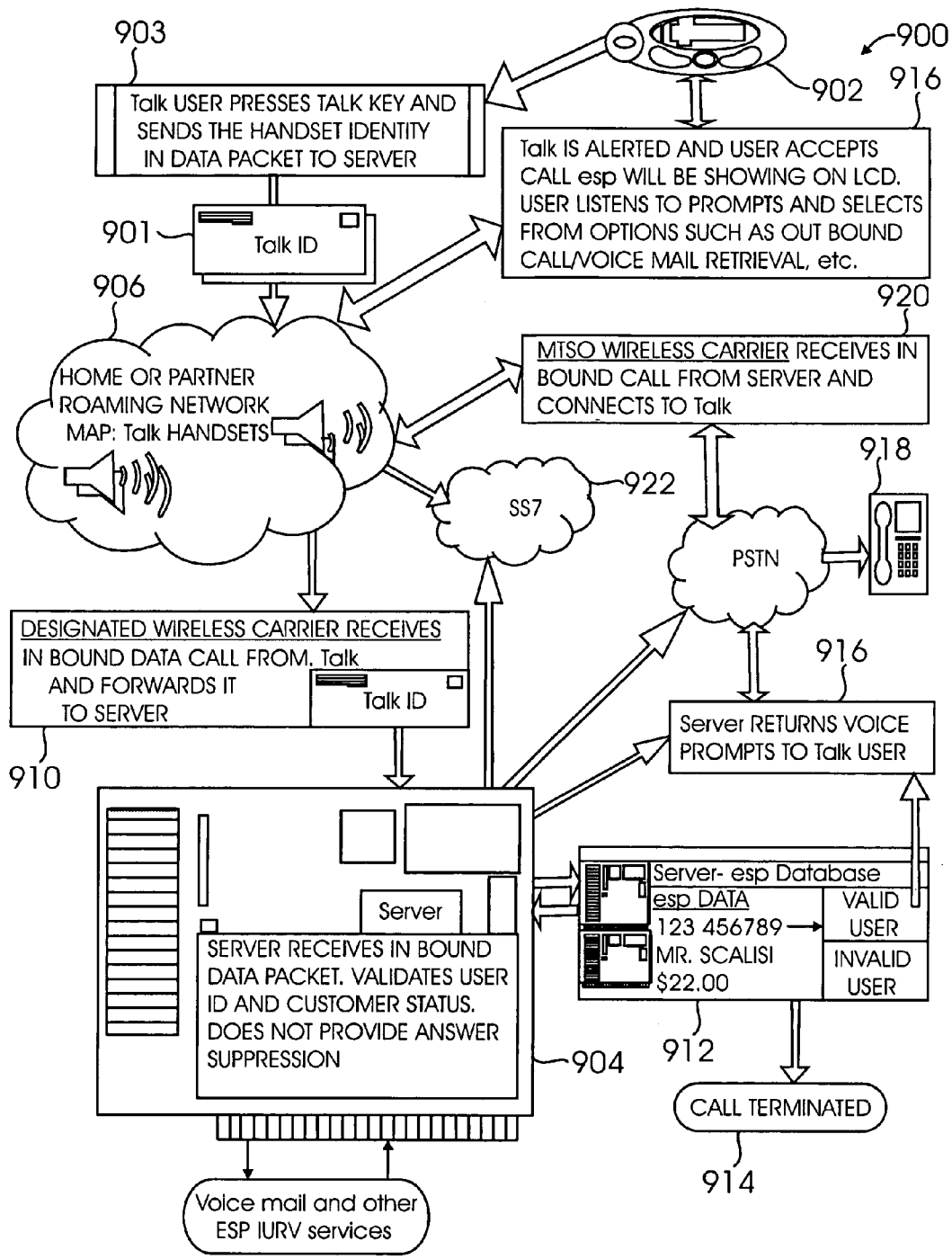
FIG. 20 is a schematic showing a preferred embodiment of the outbound call process of a call receiving pager system of the present invention having a dedicated switch.

The outbound call process for another exemplary embodiment of the call receiving pager system 900 of the present invention using a dedicated switch is shown schematically in FIG. 20. In system 900, the subscriber of a pagephone apparatus 902 activates a "talk" key on the apparatus 902 and the apparatus 902 sends a data packet 901 to a dedicated switch 904 in step 903. The data packet 901 is sent to dedicated switch 904 via a designated wireless carrier which receives the location of pagephone apparatus 902 from home or partner roaming networks 906 depending upon the location of the subscriber of the pagephone apparatus 902. The dedicated switch terminates the call upon receipt of the data packet and the apparatus returns to stand by.

Following the receipt of the data packet and the termination of the call, the dedicated switch will validate the subscriber information held in its database and determine if the user is a valid subscriber in step 912. If the subscriber's identification is invalid, the subscriber is either not called back or called back and notified that there is a problem and the outbound call is terminated in step 914. On the other hand, if the subscriber identification number is valid and the subscriber has prepaid funds to make the outbound connection, the dedicated switch calls the subscriber back and the pagephone company appears on the apparatus as the caller. The subscriber answers the call and the dedicated switch provides voice prompts to the subscriber in step 916 such as, for example, "for voice mail retrieval say one", "for operator service say two", "for outbound call service say three", "for '911' services say four", etc. The subscriber then selects the desired service. Where the subscriber selects the outbound call service and sufficient funds exist in the prepaid account of the subscriber, the switch will ask the subscriber to state the desired number and the dedicated switch will then call the desired number and connect the subscriber to the desired number. The subscriber will then hear the ringing of the desired number and wait for a party to answer the ring. Billing for the call may be in whole or in part to the subscriber on a prepaid basis. Alternatively, the subscriber may be able to listen to advertisements in exchange for free talk time.

The device of the present invention may operate by intelligent voice recognition and may be language friendly such that it is capable of translating messages in a variety of languages. The number of subscriber selections may be built indefinitely and the specific selections will depend on the desired use for the device.

With this method, the subscriber is connected to outside numbers only by the switch and only following a call back to the apparatus by the switch following the initiating data message from the operator. This operator connect system prevents the subscriber from running up uncontrolled bills and only allows the subscriber to use prepaid or free talk time. No direct two-way communication with the apparatus is involved in that all calls are made via the dedicated switch. Metering of the call will take place during the call and the call will be terminated in the event that the prepaid account reaches zero during the call. The MTSO wireless carrier receives a call in step 920 from PSTN customer 918 and the steps for receiving an incoming call from a PSTN customer then take place in accordance with the process shown and described with reference to FIG. 19. As in the case of an incoming call, SS7 922 refers to a network which allows access to all information in the wireless industry. Here SS7 922 acts as an interface between dedicated switch 904 and the home or partner roaming networks 906 which enable the identification, by MTSO wireless carrier, of the location of pagephone apparatus 902.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, solution to occur or become more pronounced are not to be construed as critical, required, or essential features or elements of any or all of the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A call receiving pager apparatus operative in a radiotelephone communications system comprising:

receiving means for receiving cellular signals;

transmitting means for a) transmitting cellular signals upon receipt of cellular signals by said receiving means to create a direct real-time two-way wireless communication between said call receiving pager apparatus and another telephone apparatus and b) transmitting at least one of a voice message, a text message, or data message to a telephone number preprogrammed into said call receiving pager apparatus wherein said message asks a call receiver at said preprogrammed telephone number to initiate a call to said call receiving pager apparatus; processing means coupled to the receiving means and the transmitting means for a) processing said received cellular signals and only transmitting cellular signals in response to receipt of a signal having a correct mobile identification number of the pager apparatus, b) producing an alert signal in response to receipt of a signal having the correct mobile identification number of the pager apparatus, and c) producing at least one of a voice message and a text message; and means for indicating reception of cellular signals coupled to the processing means.

2. The call receiving pager apparatus of claim 1, wherein said call receiving apparatus utilizes a dedicated switch.

3. The call receiving pager apparatus of claim 2, wherein said dedicated switch maintains separate numbers associated with said call receiving pager apparatus.

4. The call receiving pager apparatus of claim 3, wherein said separate numbers include a directory inbound dialing number and a mobile identification number.

5. The call receiving pager apparatus of claim 2, wherein said dedicated switch is networked with a file server.

6. The call receiving pager apparatus of claim 5, wherein said dedicated switch is further networked with a voicemail unit.

7. The call receiving pager apparatus of claim 5, wherein said file server maintains databases.

8. The call receiving pager apparatus of claim 5, wherein said dedicated switch is further networked with a line information database, said line information database containing information about a calling party and said calling party's local exchange carrier billing company.

9. The call receiving pager apparatus of claim 7, wherein said databases are a combination of customer profiles, messaging profiles, mobile identification number/verification encoding signal/voicemail unit lookup tables and call receiving pager apparatus service information.

10. The call receiving pager apparatus of claim 2, wherein said dedicated switch performs a mobile identification number/directory inbound dialing number conversion.

* * * * *